United States Patent
Delsol et al.

(10) Patent No.: US 10,075,863 B2
(45) Date of Patent: Sep. 11, 2018

(54) COMMUNICATION DEVICE AND A METHOD THEREBY, A BASE STATION AND A METHOD THEREBY, AND A SYSTEM

(71) Applicant: NEC Corporation, Tokyo (JP)

(72) Inventors: Thomas Delsol, Berkshire (GB); Dorin Panaitopol, Berkshire (GB)

(73) Assignee: NEC Corporation, Tokyo (JP)

( * ) Notice: Subject to any disclaimer, the term of this patent is extended or adjusted under 35 U.S.C. 154(b) by 127 days.

(21) Appl. No.: 14/421,552

(22) PCT Filed: Jul. 29, 2013

(86) PCT No.: PCT/JP2013/071084
§ 371 (c)(1),
(2) Date: Feb. 13, 2015

(87) PCT Pub. No.: WO2014/069064
PCT Pub. Date: May 8, 2014

(65) Prior Publication Data
US 2015/0230114 A1    Aug. 13, 2015

(30) Foreign Application Priority Data
Oct. 31, 2012  (GB) .................................. 1219604.4

(51) Int. Cl.
*H04W 24/10* (2009.01)
*H04W 36/00* (2009.01)
(Continued)

(52) U.S. Cl.
CPC ....... *H04W 24/10* (2013.01); *H04W 36/0094* (2013.01); *H04W 36/30* (2013.01); *H04W 16/26* (2013.01); *H04W 88/04* (2013.01)

(58) Field of Classification Search
CPC ...................................................... H04W 24/10
See application file for complete search history.

(56) References Cited

U.S. PATENT DOCUMENTS

| 2007/0015500 | A1 | 1/2007 | Parmer et al. |
| 2010/0322197 | A1 | 12/2010 | Adjakple et al. |

(Continued)

FOREIGN PATENT DOCUMENTS

| EP | 2 306 766 A1 | 4/2011 |
| EP | 2 306 774 A1 | 4/2011 |

(Continued)

OTHER PUBLICATIONS

NEC, "Mobile Relay architecture", 3GPP TSG-RAN WG3 Meeting #75, R3-120186, Feb. 2012.

(Continued)

*Primary Examiner* — Kent Krueger
(74) *Attorney, Agent, or Firm* — Finnegan, Henderson, Farabow, Garrett & Dunner, L.L.P.

(57) ABSTRACT

A system is disclosed in which a communication device provides measurement reports to a communication network. The communication device connects to a cell of the network and receives configuration data for at least one relay specific trigger event for triggering measurement reporting for at least one relay cell operated by a relay device for the base station. The communication device performs measurements and sends a measurement report to the communication network when the trigger event has occurred.

15 Claims, 9 Drawing Sheets

(51) Int. Cl.
*H04W 36/30* (2009.01)
*H04W 88/04* (2009.01)
*H04W 16/26* (2009.01)

(56) References Cited

U.S. PATENT DOCUMENTS

| | | |
|---|---|---|
| 2011/0039557 A1 | 2/2011 | Narasimha et al. |
| 2011/0195708 A1* | 8/2011 | Moberg ............ H04W 36/0094 455/424 |
| 2012/0003943 A1* | 1/2012 | Marinier ........... H04W 36/0083 455/73 |
| 2012/0028627 A1 | 2/2012 | Hunzinger |
| 2013/0322273 A1* | 12/2013 | Etemad ................. H04W 24/10 370/252 |

FOREIGN PATENT DOCUMENTS

| | | | |
|---|---|---|---|
| EP | 2 355 579 A1 | | 8/2011 |
| JP | 2007-20229 | | 1/2007 |
| WO | WO 2011/041748 | A2 | 4/2011 |
| WO | WO 2011/094644 | A1 | 8/2011 |
| WO | WO 2011/099509 | A1 | 8/2011 |

OTHER PUBLICATIONS

Extended European Search Report dated May 10, 2016, by the European Patent Office in counterpart European Patent Application No. 13851446.8.

3GPP TS 36.331, V11.1.0 , $3^{rd}$ Generation Partnership Project; Technical Specification Group Radio Access Network; Evolved Universal Terrestrial Radio Access (E-UTRA); Radio Resource Control (RRC); Protocol specification, (Release 11), Sep. 2012.

Search Report dated Mar. 15, 2013 by the UK Patent Office in counterpart UK Patent Application No. GB1219604.4.

International Search Report dated Aug. 27, 2013 in corresponding PCT International Application.

* cited by examiner

COMMUNICATION DEVICE AND A METHOD THEREBY, A BASE STATION AND A METHOD THEREBY, AND A SYSTEM

CROSS-REFERENCE TO RELATED PATENT APPLICATIONS

This application is a National Stage Entry of International Application No. PCT/JP2013/071084, filed Jul. 29, 2013, which claims priority from UK Patent Application No. GB 1219604.4, filed Oct. 31, 2012. The entire contents of the above-referenced applications are expressly incorporated herein by reference.

TECHNICAL FIELD

The present invention relates to a communication system and to components thereof for providing communication services to mobile or fixed communication devices. The invention has particular but not exclusive relevance to providing handover to/from user equipment operating as a relay in Long Term Evolution (LTE) communication systems currently being developed by the $3^{rd}$ Generation Partnership Project (3GPP).

BACKGROUND ART

In 3GPP LTE networks, a base station (i.e. evolved NodeB, eNB) of a Radio Access Network (RAN) transmits data and signaling between a core network (CN) and User Equipment (UEs) located within the base station's coverage area.

In addition to normal base stations, relay base stations (relay nodes) were introduced in Rel-10 of the 3GPP standards documentation to provide coverage extension within the cell(s) operated by base stations, as a tool to improve, for example, the coverage of high data rates for user equipment, temporary network deployment, cell edge throughput and/or to provide coverage in new cell areas. Relaying is realised by having a relay node wirelessly connected to a donor base station (DeNB). In addition to serving its own 'donor' cell, the DeNB serves the RN (and hence any user equipment connected to this relay node), via a modified version of the Evolved Universal Terrestrial Radio Access (E-UTRA) radio interface. The modified interface is referred to as the 'RN-Un' interface. The 3GPP standards documentation defines in Section 4.7 of TS 36.300 v11.3.0 (the content of which is herein incorporated by reference) the architecture of RNs and the way in which they establish connections with their donor base station. Mobile RNs (MRNs) are also included in Rel-11 as a study item and the deployment use case is limited to high speed trains where the relay node in mounted on and moves with the train.

Each RN is provided with many aspects of a base station's functionality and is therefore capable of acting as a base station serving user equipment in its own 'relay' cell via a wireless interface referred to as the 'RN-Uu' interface. From the perspective of the user equipment in the relay cell, therefore, the RN appears to be a conventional LTE base station. Typically an RN will be serving multiple UEs so the aggregated data for all these UEs must pass over the 'RN-Un' interface. In addition to the base station functionality, however, the RN also supports a subset of the UE functionality including, for example, many aspects of the physical layer, layer-2, radio resource control (RRC), and non-access stratum (NAS) functionality, to allow it to connect wirelessly to the DeNB.

The DeNB is capable of handling communication 'directly' to and from user equipment camped in its own cell via a conventional 'Uu' interface between the DeNB and the user equipment. The DeNB is also capable of handling communication 'indirectly' with user equipment camped in the relay cell, via the 'RN-Un' interface, the RN, and the 'RN-Uu' interface.

As mobile telephones (or other user equipments) move around in the area covered by the communication system, they are handed over from one cell (i.e. a serving cell operated by either a base station or a relay node) to another suitable cell, depending on signal conditions and other requirements, such as a quality of service requested by the particular mobile telephone, the type of service used, overall system load, and the like. A trigger for handing over a mobile telephone to a new cell may be based on signal measurements performed by the particular mobile telephone with respect to the current and/or the neighbour base station cell(s). The measurements might comprise measuring the strength of cell reference signals (CRS) or channel state reference signals (CSI-RS) broadcast by the neighbouring cells. Depending on the technology used, the mobile telephone might also determine signal conditions in any given cell by measuring either one of a Reference Signal Receive Power (RSRP), a Reference Signal Receive Quality (RSRQ), Received Signal Strength Indicator (RSSI) and a Received Signal Code Power (RSCP) of that cell—depending on the access technology used in that cell.

When the signal measurements indicate more favourable signal conditions in a different cell than the current serving cell, the mobile telephone informs the serving base station about the favourable signal conditions, based on which indication the base station may initiate handover procedures to this new cell. Therefore, handover decision and target cell selection are made by the serving base station by taking into account the indication received from the mobile telephone. The type of triggers and the related measurements are detailed in section 5.5.4 of the 3GPP TS 36.331 v11.1.0 standard, the content of which is herein incorporated by reference. In particular, the above standard defines measurement report triggering related to eight different event types (Events A1 to A6, B1, and B2) that the base station may configure for user equipment within its cell(s). In summary, each event relates to a scenario in which measured signal conditions meet a predetermined criteria. When a particular event occurs (i.e. measured signal conditions meet the associated predetermined criteria) transmission of an event report describing the event type and associated parameters is triggered. For example, an event may occur if measured signal conditions in the mobile telephone's serving cell (and optionally also modified by a pre-defined offset value) become worse (or become better in a neighbouring cell) than a pre-defined threshold. 3GPP has not introduced any events related specifically to relay nodes because, from the network point of view, relay nodes are treated as base stations (and indeed relay node cells appear to be base station cells for the mobile telephones).

Further details of the overall mobility sequence are described in section 10.1.2 of the 3GPP TS 36.300 standard, which describes the configuration of measurements by the base station and the subsequent triggering of handover.

Recently, 3GPP introduced the possibility of direct, device-to-device (D2D) communications between mobile telephones that are in each other's proximity. In case of D2D communications, user data is exchanged between the two (or more) mobile telephones without routing it via the radio access network and the core network, whilst maintaining a control link between each involved mobile telephone and their respective base stations. In LTE networks, D2D communications are thus carried out under continuous network control and only whilst the involved mobile telephones are operating within the network's coverage. The D2D approach results in a more efficient usage of the valuable radio resources available to the base station(s). Example D2D communications have been presented in 3GPP document no. S1-113344 titled "Feasibility Study for Proximity Services".

Direct communication channels between mobile telephones may also be beneficially used to implement a UE-based relaying function when one mobile telephone relays data and signalling for another mobile telephone (i.e. to/from a serving base station). The relaying mobile telephone is called UE Relay (UE-R) throughout this document. Such a UE-based relaying function might beneficially further improve the cell coverage of a serving base station and/or load balancing of the LTE network.

SUMMARY OF INVENTION

Technical Problem

However, the current standards do not address such UE-based relaying and it is also not possible to handover mobile telephones to/from cells operated by UE Relays. Even if UE Relays were treated as normal relay nodes, existing handover techniques are not applicable, because existing relay nodes (including Mobile Relay Nodes or MRNs) are deployed by the network operators and thus form an integral part of the network infrastructure whereas UE-based relaying is provided in a more or less ad-hoc manner.

The present invention therefore aims to provide an improved communication system and improved components of the communication system which overcome or at least alleviate one or more of the above issues.

Solution to Problem

In one aspect, the invention provides a communication device for providing measurement reports to a communication network comprising a plurality of cells, the communication device comprising: means for connecting to a cell, of said plurality of cells, for sending and receiving user data; means for receiving configuration data for configuring measurements in at least one of said plurality of cells wherein said configuration data defines at least one relay specific trigger event for triggering measurement reporting for at least one relay cell operated by a relay device for a base station; means for performing measurements, based on said received configuration data, in said at least one relay cell; means for determining whether or not said relay specific trigger event has occurred based on results of said measurements; and means for sending a measurement report, to the communication network, when said trigger event has been determined to have occurred.

The at least one relay cell may comprise a candidate cell for potential handover to that cell.

The configuration data may define a trigger event which occurs when a result of said measurements meets or exceeds a threshold value. The configuration data may define a trigger event which occurs when a result of said measurements meets or falls below a (or a further) threshold value. The threshold may comprise a value provided in the configuration data.

The configuration data may define a trigger event which occurs when a result of the measurements meets or exceeds a result of a corresponding measurement for a further of the plurality of cells. The configuration data may define a trigger event which occurs when a result of the measurements meets or falls below a result of a corresponding measurement for a further (or yet further) of the plurality of cells.

The configuration data may define at least one hysteresis (and/or offset) value defining an extent to which a result of the measurement should exceed or fall below a threshold or corresponding measurement for a further of the plurality of cells for an event to be triggered.

The measurements results may comprise a measure of signal conditions of the source cell.

The configuration data may define a trigger event which occurs when signal conditions in said at least one relay cell are better than signal conditions in a cell in which the communications device is currently connected.

The configuration data may further define an entry condition of a trigger event which occurs when at least one of the following apply: (a) signal conditions in said at least one relay cell are better than signal conditions in a cell in which said communications device is currently connected; and (b) signal conditions in said at least one relay cell are better than signal conditions in a non-relay neighbour cell.

The configuration data may further define a leaving condition of a trigger event which occurs when at least one of the following apply: (a) signal conditions in said at least one relay cell are worse than signal conditions in a cell in which said communications device is currently connected; and (b) signal conditions in said at least one relay cell are worse than signal conditions in a non-relay neighbour cell.

The configuration data may further define an entry condition of a trigger event which occurs when at least one of the following apply: (a) signal conditions in said at least one relay cell are better than signal conditions in a cell in which said communications device is currently connected; (b) signal conditions in said at least one relay cell are better than signal conditions in a non-relay neighbour cell; and (c) signal conditions in the current cell fall below a threshold value.

The configuration data may further define a leaving condition of a trigger event which occurs when at least one of the following apply: (a) signal conditions in said at least one relay cell are worse than signal conditions in a cell in which said communications device is currently connected; (b) signal conditions in said at least one relay cell are worse than signal conditions in a non-relay neighbour cell; and (c) signal conditions in the current cell are above a threshold value.

The configuration data may define an entry condition of a trigger event which occurs when at least one of the following apply: (a) signal conditions in said at least one relay cell are better than a first threshold value; and (b) signal conditions in a cell in which the communications device is currently connected fall below a second threshold. In this case, the configuration data may define a trigger event which occurs when: (c) signal conditions in a neighbouring cell also fall below the second threshold.

The configuration data may define a leaving condition of a trigger event which occurs when at least one of the following apply: (a) signal conditions in said at least one relay cell are worse than a first threshold value; and (b) signal conditions in a cell in which the communications device is currently connected are above a second threshold. In this case, the configuration data may define a trigger event which occurs when: (c) signal conditions in a neighbouring cell are also above the second threshold.

The configuration data may further define an entry condition of a trigger event which occurs when at least one of the following apply: (a) signal conditions in said at least one relay cell are better than signal conditions in a cell in which the communications device is currently connected; and (b) signal conditions in a non-relay neighbour cell fall below a threshold value.

The configuration data may further define a leaving condition of a trigger event which occurs when at least one of the following apply: (a) signal conditions in said at least one relay cell are worse than signal conditions in a cell in which the communications device is currently connected; and (b) signal conditions in a non-relay neighbour cell are above a threshold value.

The configuration data may define an entry condition of a trigger event which occurs when signal conditions in said at least one relay cell are better than signal conditions in a non-relay neighbour cell.

The configuration data may define a leaving condition of a trigger event which occurs when signal conditions in said at least one relay cell are worse than signal conditions in a non-relay neighbour cell.

The measurement results may comprise a measure of at least one of: a reference signal receive power 'RSRP'; a reference signal receive quality 'RSRQ'; a received signal strength indicator 'RSSI'; and a received signal code power 'RSCP'.

The configuration data may define a periodic trigger event.

The configuration data may comprise a hysteresis value to define different 'entry' and 'leaving' conditions for initiating triggering of an event and for avoiding repeated triggering of the event respectively. In this case, the configuration data may, for example, comprise a timer value associated with the trigger event having an entry condition and a leaving condition which causes the start of a timer when the entering condition is met and in which the event is only triggered when the timer ends whilst the leaving condition has still not been met. If the leaving condition is met before the timer ends then the event may not be triggered.

The measurement report may comprise an identification of the trigger event and an identification of the relay cell. The measurement report may comprise information on a received power level in said relay cell.

The relay device may be a mobile communication device.

The communication device may further comprise means for receiving additional configuration data for configuring measurements in at least one further cell wherein the additional configuration data comprises at least one trigger event specific to base station cells.

The communication device may be operable to receive the configuration data and/or send the measurement report using Radio Resource Control 'RRC' signalling.

The communication device may comprise means for operating the communication device as a relay device for relaying user data between the communication device and another communication device. In this case, the means for operating the communication device as a relay device may be operable to relay user data via a non-LTE interface, or an LTE interface (such as a 'UER-Uu' interface). Alternatively, the means for operating the communication device as a relay device may be operable to relay user data via a non-LTE interface, such as any of an UMTS, HSPA, Wi-Fi, CDMA, or a WiMAX interface.

The communication device may comprise at least one of a mobile telephone, a personal digital assistant, a laptop computer, a web browser, and an e-book reader.

In another aspect, the invention also provides a base station for obtaining measurement reports from a communication device in a communication network comprising a plurality of cells, the base station comprising: means for providing, to the communication device, configuration data for configuring measurements in at least one cell of the communication network wherein the configuration data defines at least one relay specific trigger event for triggering measurement reporting for at least one relay cell operated by a relay device for the or another base station; and means for receiving a measurement report, from the communication device, when the at least one relay specific trigger event has occurred.

The base station may further comprise means for selecting a handover target cell for the communication device based on the received measurement report.

The base station may comprising an E-UTRAN base station. The base station may further comprise means for providing a 'UER-Un' interface between the base station and a communication device configured to operate as a relay device.

In a further aspect, the invention provides a base station for operating a cell in a communication network comprising a plurality of mobile communication devices, the base station comprising: means for obtaining information indicating that at least one of the mobile communication devices is operating as a relay device that operates a relay cell; and means for maintaining information identifying each said mobile communication device operating as a relay device.

The base station may further comprise means for generating configuration data, based on the maintained information, for configuring measurements for each relay cell operated by a mobile communication device at, wherein said configuration data defines at least one relay specific trigger event. The obtaining means may be operable to obtain said information from the communication device operating said at least relay device cell or from another base station.

Another aspect of the present invention provides a computer program product comprising computer implementable instructions for causing a programmable computer device to become configured as a communication device as described above or as a base station as described above.

The invention also provides a corresponding system, methods and computer software products that may be provided on a carrier signal or on a recording medium, such as a CD, DVD or the like.

Advantageous Effects of Invention

According to each exemplary aspect of the present invention stated above, it is possible to provide a communications device and a method thereby, a base station and a method thereby, and a system for handovering a communication device to/from cell operated by a relay device for a base station.

BRIEF DESCRIPTION OF DRAWINGS

Embodiments of the invention will now be described, by way of example only, with reference to the attached figures in which.

DESCRIPTION OF EMBODIMENTS

<Overview>

Figure 1:
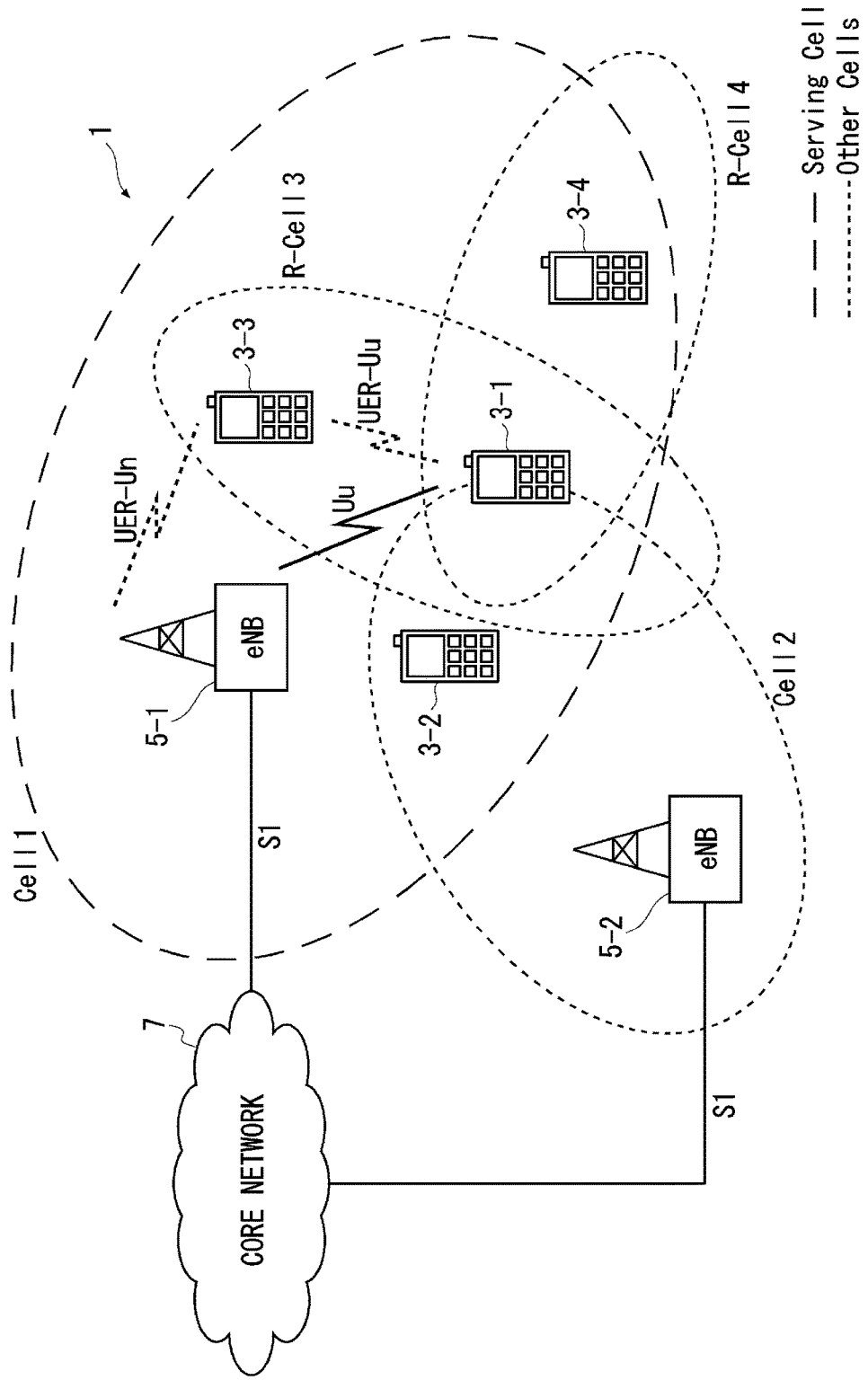
FIG. 1 schematically illustrates a mobile telecommunication system scenario in which a cell currently serving a mobile telephone is operated by a base station and some of the neighbouring cells are operated by other mobile telephones configured to work as a UE relay.

FIG. 1 schematically illustrates a mobile (cellular) telecommunication system 1 including user equipment 3 (comprising a plurality of mobile telephones 3-1 to 3-4) and base stations 5 (comprising a plurality of base stations 5-1 to 5-2). Each base station 5 is coupled to a core network 7 via an 'S1' interface and the core network 7 is also coupled to other networks (e.g. the Internet) via one or more gateways (not shown). The core network 7 includes, amongst other things, a mobility management entity (MME), a home subscriber server (HSS), a serving gateway (SGW) and a Packet Data Network (PDN) Gateway (PGW), which have also been omitted for sake of simplicity. The 'S1' interface between the base stations 5 and the core network 7 might utilise, for example, a high speed, high bandwidth communication link, such as an optical fiber link and the like. An 'X2' interface (not shown) is also provided between neighbouring base stations 5 to facilitate data exchange between them and to compute eNB neighbour list. As those skilled in the art will appreciate, whilst four mobile telephones 3 and two base stations 5 are shown in FIG. 1 for illustration purposes, additional user equipment and base stations may be present in a deployed system.

In this example, some or all of the mobile telephones 3 support relaying by operating their own relay cells, such as 'R-Cell 3' and 'R-Cell 4' of the third and fourth mobile telephones 3-3 and 3-4, respectively. The communication network 1 keeps track of which mobile telephones 3 are (or can be) used as relays, and will also receive information from the mobile telephones 3 to be relayed in order to determine the best relay cell to be used as a target cell when performing handover. The information received by the network could be any information deduced from the measurements performed by the mobile telephones 3. For example, the mobile telephones 3 might classify their neighbour cells in order of received power. However, since the cells are only reported if their signal conditions meet some predefined criteria (set by the network), detailed measurements might not need to be provided by the mobile telephones 3. Identifying the target cell(s) might be sufficient.

As illustrated in FIG. 1, the first mobile telephone 3-1 is initially served directly by its base station 5-1 via a cell denoted 'Cell 1' and using the conventional 'Uu' air interface therebetween. Therefore, any user data between the mobile telephone 3-1 and its peer entity (e.g. another mobile telephone 3 or a remote server) is transmitted via the serving base station 5-1 (and then via the core network 7 using the 'S1' interface). However, when the mobile telephone 3-1 approaches the edge of 'Cell 1' or when the signal conditions within this cell begin to deteriorate the mobile telephone 3-1 needs to handover to another cell, such as 'Cell 2' operated by base station 5-2 or any other suitable cell. Therefore, the mobile telephone 3-1 is configured (by base station 5-1) to perform signal measurements with respect to neighbouring cells and report the results based on these measurements in case certain predetermined signal conditions are met (e.g. at least one of the above mentioned Events A1 to B2 has occurred as set out in section 5.5.4 of the 3GPP TS 36.331 standard). Information defining the predetermined signal conditions are provided by the base station 5-1 currently serving the mobile telephone 3-1. The above measurement and reporting process serves to assist the serving base station 5-1 to identify when handover may be necessary and/or to select a suitable target cell when a handover becomes necessary for the mobile telephone 3-1.

As described in section 5.4 of the 3GPP standards specification 36.331 V11.1.0, the base station 5 configures signal measurements for the mobile telephone 3-1 and receives the results of any measurement (i.e. an indication that a configured event has occurred) using RRC signalling. When the mobile telephone 3-1 indicates that a predetermined handover condition is met the base station 5 proceeds to selecting a new serving cell that provides more favourable signal conditions to the particular mobile telephone 3.

However, in this example, the serving base station 5-1 also beneficially configures the mobile telephone 3-1 to measure the quality of signals transmitted by mobile telephones that are in the vicinity, having UE-based relaying functionality (e.g. mobile telephone 3-3 providing UE-based relaying functionality within its relay cell denoted 'R-Cell 3'). Furthermore, in this example, the serving base station 5-1 configures a number of UE Relay specific events (e.g. Events R0 to R5 that will be described in detail below) based on measurement associated with UE based relay cells. In this way, the serving base station 5-1 is advantageously able to set event configuration for mobile telephones 3 to allow them to handover to UE-based relay cells rather than to 'normal' cells (e.g. cells operated by an RN or eNB, NB, etc.). However, the serving base station may also elect to use the same handover triggers (i.e. Events A1 to B2) regardless the type of cell but set different parameters for each cell to be measured. In order to facilitate the use of the UE Relay specific events, the serving base station 5-1 is beneficially able to keep track of mobile telephones 3 that are operating relay cells (i.e. UE Relays) and that are registered in a cell operated by the serving base station 5-1 (e.g. based on information provided to the network by the mobile telephones 3 operating these cells or by other means such as subscription information obtained from the HSS). Hence, the serving base station 5-1 can beneficially determine which of the measured cells are UE Relay cells.

The mobile telephone 3-1 performs measurements with respect to signals transmitted by other mobile telephones 3 that are operating as UE Relays in its vicinity (such as mobile telephone 3-3) and sends measurement reports, when triggered by an associated event configured by the base station, in order to cause the base station to initiate a handover procedure if appropriate. Optionally, the mobile telephone 3-1 also performs all the normal measurements with respect to the serving cell (i.e. Cell 1) and/or the neighbouring base station cells (e.g. Cell 2). Therefore, when a handover from the current serving cell ('Cell 1') becomes necessary, the mobile telephone 3-1 can be handed over to whichever cell offers the most satisfactory conditions for this mobile telephone 3-1 to continue its communication. For example, the mobile telephone 3-1 can be handed over to a relay cell ('R-Cell 3') operated by another mobile telephone 3-3, if the signal conditions in that cell are satisfactory.

In this example, the relaying mobile telephone 3-3 is shown as being connected to the same serving base station 5-1 as the mobile telephone 3-1 sending the measurement report although it will be appreciated that the relaying mobile telephones 3-3 and the measuring mobile telephone 3-1 may be served by different base stations. Accordingly, in this example, after handover when the mobile telephone 3-1 is served by the UE Relay 3-3, a 'UER-Un' interface is provided between the serving base station 5-1 and the relaying mobile telephone 3-3, and a 'UER-Uu' interface is provided between the relaying mobile telephone 3-3 and the served mobile telephone 3-1. However, the 'S1' interface between the serving base station 5-1 and the core network 7 remains unchanged even after handover to 'R-Cell 3'.

In summary, therefore, the system beneficially takes into account that some of the cells are operated by a mobile telephone 3 (e.g. as opposed to relay cells operated by a conventional relay node) and is able to set different handover conditions with respect to conventional/relay cells operated by a base station/conventional relay node and relay cells operated by mobile telephones. Therefore, when a serving base station configures the signal measurements for a mobile telephone, it configures different events for the relay cells operated by the mobile telephones than for any cells operated by base stations or by conventional relay nodes. Thus, the serving base station can ensure that UE-based relaying is only used when absolutely necessary, for example when base station cells or conventional relay node cells (that have been deployed by the network operator) are not available or when such cells do not offer a minimum required signal quality for the particular service used by a mobile telephone.

<Mobile Telephone>

Figure 2:
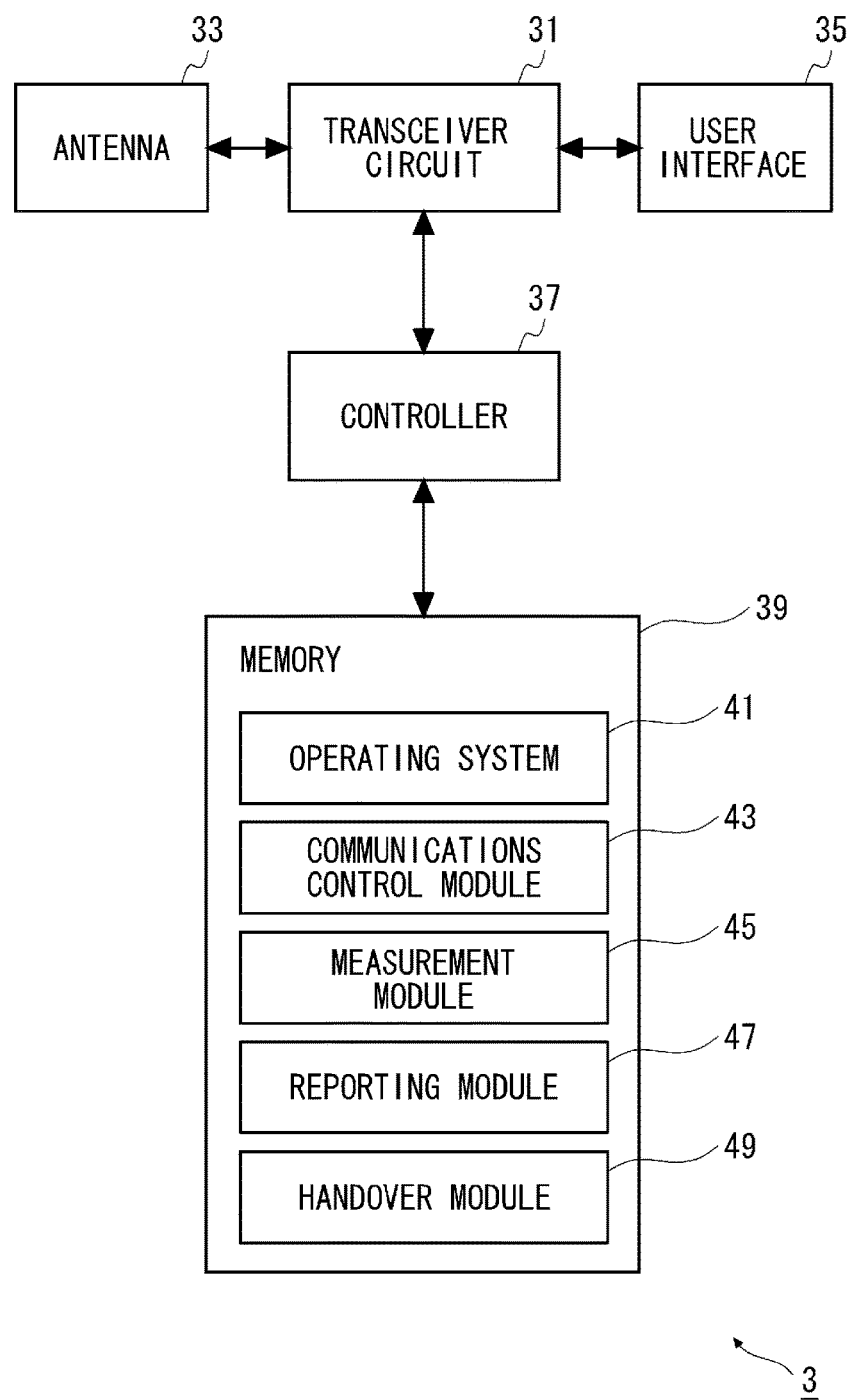
FIG. 2 is a block diagram illustrating the main components of the mobile telephone forming part of the system shown in FIG. 1.

FIG. 2 is a block diagram illustrating the main components of one of the mobile telephones 3 shown in FIG. 1. As shown, the mobile telephone 3 includes transceiver circuitry 31 which is operable to transmit signals to, and to receive signals from, the base station 5 and/or other mobile telephones via at least one antenna 33. The mobile telephone 3 may of course have all the usual functionality of a conventional mobile telephone 3 (such as a user interface 35) and this may be provided by any combination of hardware, software and firmware, as appropriate. The operation of the transceiver circuit 31 is controlled by a controller 37 in accordance with software stored in memory 39. The software includes, among other things, an operating system 41, a communications control module 43, a measurement module 45, a reporting module 47, and a handover module 49.

The communications control module 43 is operable to handle (e.g. generate, send and receive) control signals for controlling the connections between the mobile telephone 3 and other user equipment or various network nodes, such as the base station 5. The communications control module 43 also controls the separate flows of uplink/downlink data and control data that are to be transmitted to/from the relayed mobile telephones in case the mobile telephone 3 is operating as an UE Relay.

The measurement module 45 is operable to perform desired signal measurements (e.g. CRS or CSI-RS measurements), to determine associated signal quality values (e.g. RSRP and RSRQ) and to determine when particular configured event conditions (e.g. A1 to B2 or R0 to R5) have been met. When event conditions are determined to have been met, the measurement module 45 identifies, and indicates to the reporting module 47, each neighbouring/relay cell to which the event relates.

The reporting module 47 is operable to generate and send information (e.g. by triggering a measurement report) to the serving base station 5, when one of the configured events has occurred (e.g. based on the results of signal measurements performed by the measurement module 45). The information sent includes an indication of each neighbouring/relay cell to which the event relates and/or any further information that may assist the serving base station in making a handover decision.

The handover module 49 is operable to perform handover of the mobile telephone 3 from a current serving cell to another cell, based on instructions received from the base station 5.

<Base Station>

Figure 3:
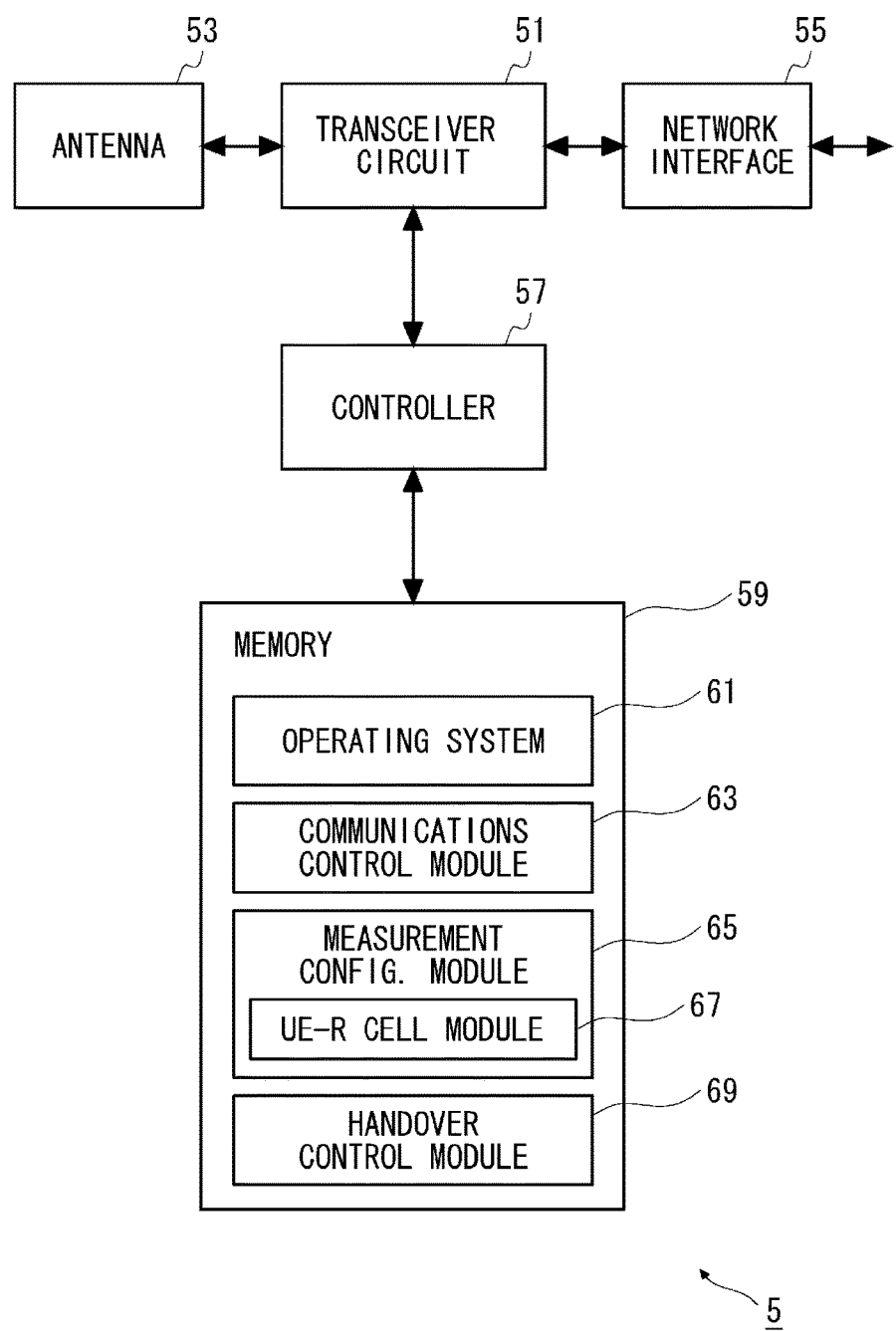
FIG. 3 is a block diagram illustrating the main components of the base station forming part of the system shown in FIG. 1.

FIG. 3 is a block diagram illustrating the main components of one of the base stations 5 shown in FIG. 1. As shown, the base station 5 includes transceiver circuitry 51 which is operable to transmit signals to, and to receive signals from, the mobile telephones 3 via at least one antenna 53. The base station 5 is also operable to transmit signals to and to receive signals from nodes in the core network 7 (such as the MME or the SGW) and other base stations, via a network interface 55. The operation of the transceiver circuit 51 is controlled by a controller 57 in accordance with software stored in memory 59. The software includes, among other things, an operating system 61, a communications control module 63, a measurement configuration module 65 (which also includes an UE-R cell module 67), and a handover control module 69.

The communications control module 63 is operable to control communications between the base station 5 and the mobile telephones 3, and the network devices such as the MME, the HSS, the SGW, the PGW, and neighbour base stations. The communications control module 63 is also operable to send relaying-capable mobile telephones 3 configuration data that controls the mobile telephone 3 to operate either in a conventional transmission mode (in which the mobile telephone 3 does not provide any relaying for other user equipment) or in a relaying transmission mode (in which the mobile telephone 3 sends and receives data to be relayed to or from other user equipment).

The measurement configuration module 65 is operable to control the mobile telephones 3 to cause them to perform desired signal measurements (for example CRS or CSI-RS measurements) and to send associated information (e.g. in a measurement report) when a configured event has occurred. The measurement configuration module 65 is also operable to pass the relevant information from the measurement report to the handover control module 69 for the purposes of identifying e.g. when handover should occur and/or to what cell.

The UE-R cell module 67 is operable to keep track of active UE-R cells and to control the mobile telephones 3 to cause them to perform desired signal measurements (for example CRS or CSI-RS measurements) with respect to UE Relay cells (such as 'R-Cell 3' and 'R-Cell 4') and to send associated information (e.g. in a measurement report) when a configured relay event has occurred. The UE-R cell module 67 passes the relevant information from the measurement report to the handover control module 69 for the purposes of identifying when handover should occur to a UE-R cell and the destination of the handover.

The handover control module 69 is operable to control handover of the mobile telephones 3 currently served by the cell(s) of the base station 5 to other cells operated by either one of the base stations (such as 'Cell 1' or 'Cell 2') or by the mobile telephones having relaying function (such as 'R-Cell 3' or 'R-Cell 4').

In the above description, the mobile telephone 3 and the base station 5 are described for ease of understanding as having a number of discrete modules (such as the communications control modules, the reporting module, and the handover control module). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

<UE-R Events>

The following includes a description of some of the events that might be used for mobility management (i.e. handover) of mobile telephones 3 to UE-Relay cells. In particular, the following events might be used to trigger handover involving mobile telephones (or other user equipment) having relaying capability or relaying function. These events might be particularly useful at least in the event of handover from a serving base station to a neighbour UE Relay.

The events in this example comprise a hysteresis value to define different entering and leaving conditions for effectively initiating the triggering of an event and suppressing repeated triggering of the same event respectively.

The UE-R events for triggering entry to a relay cell that can be configured by the base station include, for example:

[Event R0]
Entering condition:
(UE-R RSRP+an offset value−Hyst)>RSRP of serving cell
Leaving condition:
(UE-R RSRP+an offset value+Hyst)<RSRP of serving cell

[Event R1]
Entering condition:
((UE-R RSRP+an offset value−Hyst)>RSRP of serving cell) and
((UE-R RSRP+an offset value−Hyst)>RSRP of neighbour cell(s)) and
(RSRP serving cell+Hyst<a threshold)
Leaving condition:
((UE-R RSRP+an offset value+Hyst)<RSRP of serving cell) and
((UE-R RSRP+an offset value+Hyst)<RSRP of neighbour cell(s)) and
(RSRP serving cell−Hyst>a threshold)

[Event R2]
Entering condition:
(UE-R RSRP−Hyst>a $1^{st}$ threshold) and
(RSRP of serving cell+Hyst<a $2^{nd}$ threshold) and
optionally (RSRP of neighbour cell+Hyst<a $2^{nd}$ threshold)
Leaving condition:
(UE-R RSRP+Hyst<a $1^{st}$ threshold) and
(RSRP of serving cell−Hyst>a $2^{nd}$ threshold) and
optionally (RSRP of neighbour cell−Hyst>a $2^{nd}$ threshold)

[Event R3]
Entering condition:
((UE-R RSRP+an offset value−Hyst)>RSRP of serving cell) and
((UE-R RSRP+an offset value−Hyst)>RSRP of neighbour cells)
Leaving condition:
((UE-R RSRP+an offset value+Hyst)<RSRP of serving cell) and
((UE-R RSRP+an offset value+Hyst)<RSRP of neighbour cells)

[Event R4]
Entering condition:
((RSRP of serving cell+an offset value+Hyst)<RSRP UE-R) and
optionally (RSRP of other neighbour(s)+Hyst<threshold)
Leaving condition:
((RSRP of serving cell+an offset value−Hyst)>RSRP UE-R) and
optionally (RSRP of other neighbour(s)−Hyst>threshold)

[Event R5]
Entering condition:
(RSRP of UE-R+Hyst)>threshold
Leaving condition:
(RSRP of UE-R−Hyst)<threshold When hysteresis is applied to the RSRP of the serving cell and also one or more neighbour cell(s) and/or UE-Relay cell (such as Events R1 and R4), the value of the hysteresis might be the same for all cells or it might be different for each cell (or group of cells).

This mechanism can also be considered for some operator to perform load balancing (i.e. to reduce usage of the base stations resources) or to re-use the same resources with a lower power of transmission via an UE Relay.

For all of the above events, the various offset and threshold values are chosen by the base station (or another network entity). The offset value is optional, i.e. it can be zero or a finite value (negative or positive). The $1^{st}$ threshold value might be selected to be higher than the $2^{nd}$ threshold value, and vice versa. However, depending on requirements, it can be beneficial to set the $1^{st}$ and $2^{nd}$ threshold values to be equal.

Generally, hysteresis can be applied such that the 'entry condition' for triggering an event requires a better value of the signal quality measure (e.g. a higher value of RSRP) than would otherwise be the case and 'leaving condition' for avoiding the repeated triggering of the event requires a lower value of the signal quality measure (e.g. a lower value of RSRP) than would otherwise be the case. This beneficially allows the system to avoid repetitive triggering of events when signal quality is fluctuating around the trigger level.

<Operation>

Figure 4:
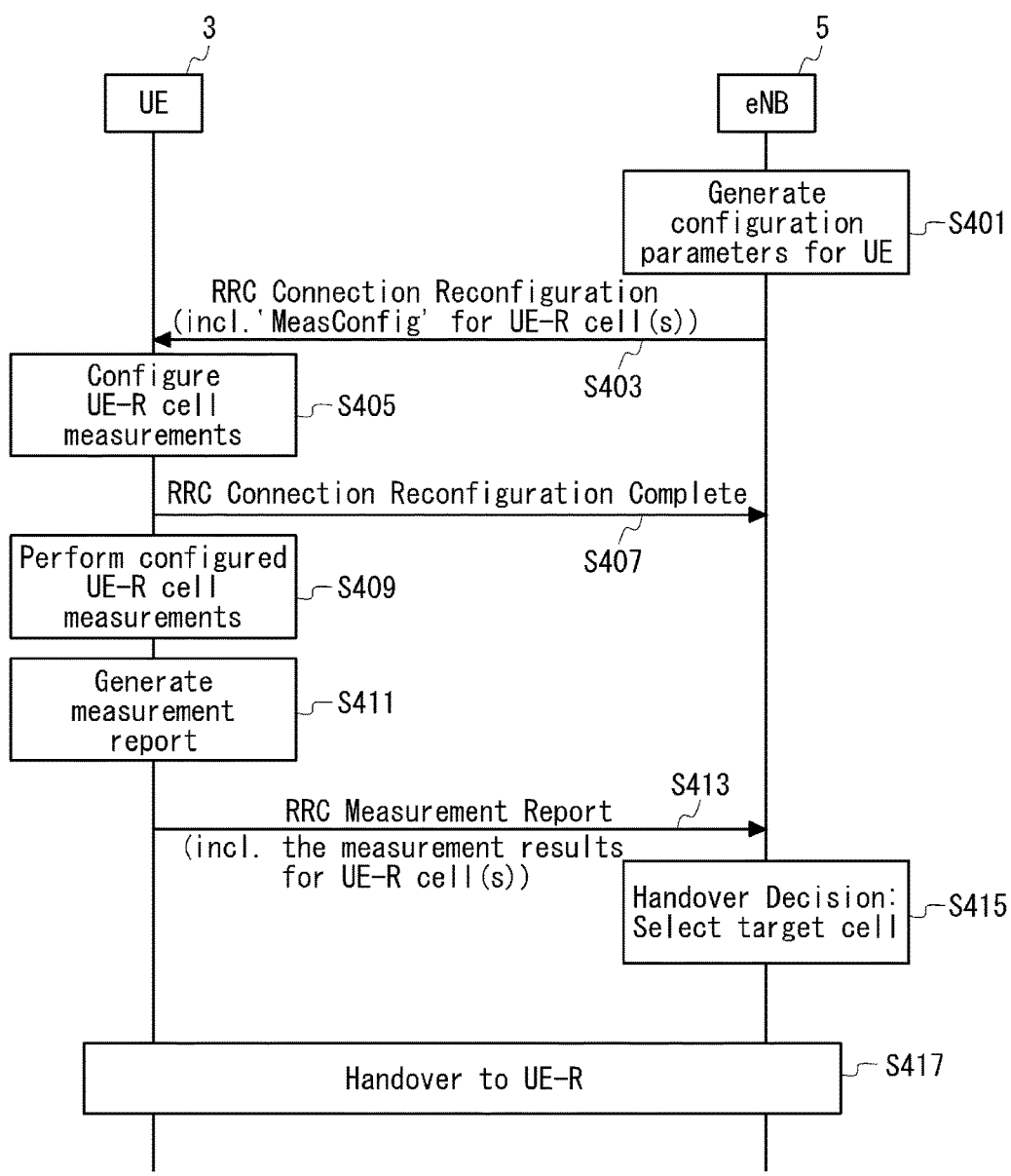
FIG. 4 is a timing diagram illustrating signalling messages exchanged between the mobile telephone and the base station shown in FIG. 1.

FIG. 4 is a timing diagram illustrating a method performed by components of the communication system 1 when configuring and performing handover related measurements and reporting.

In this embodiment, the mobile telephone 3 measures the radio signals of the UE-R cell(s) as requested by its serving base station 5. Although not shown in FIG. 4, the mobile telephone 3 in this embodiment might initially have an active packet data connection (routed via its serving base station 5) with another communication node. Therefore, the mobile telephone 3 is in an 'RRC Connected' mode, even if it does not transmit or receive any data.

As shown, in step s401, the base station 5 (using its measurement configuration module 65 and UE-R cell module 67) generates configuration parameters for the mobile telephone 3 so that when a handover becomes necessary, a suitable handover target cell (i.e. a neighbour base station cell and/or UE-R cell with suitable signal conditions) can be selected for this mobile telephone 3. The configuration parameters include criteria which cause the mobile telephone 3 to send a measurement report, and also specify the details of such measurement reports (e.g. the quantities to be measured, such as either one of RSRP, RSRQ, and RSCP). The criteria might include either periodic or event-triggered criteria, or both. In this example, the generated configurations include configuration parameters for UE-R cells.

In step s403, the base station 5 (using its communications control module 63 and transceiver circuit 51) generates and sends an 'RRC Connection Reconfiguration' message to the mobile telephone 3. The base station 5 includes in this message a 'MeasConfig' information element (IE), which specifies the kind of measurements and the conditions under which the measurements need to be initiated by the mobile telephone 3. In particular, the 'MeasConfig' IE includes measurement parameters for at least one of the event types (i.e. events A1 to A6, B1, and B2) as specified in the 3GPP TS 36.331 v11.1.0 standard and/or at least one of the UE-R events (i.e. Events R0 to R5) as specified above. The mobile telephone 3 will use these measurement parameters to control the operation of its measurement module 45. In particular, the measurement module 45 is taking measurements on the signals from the neighbouring base stations and relaying mobile telephones in order to find a new cell to which the mobile telephone 3 can handover when it is experiencing a degradation in signal quality in the current cell (e.g. due to the mobile telephone 3 moving away from its serving base station 5) and/or when the signals from one of the other base stations and/or relaying mobile telephones become better than a pre-set threshold (or e.g. when the signal from the serving relaying mobile telephone becomes worst than a pre-set threshold).

Therefore, in step s405, the mobile telephone 3 configures its measurement module 45 in accordance with the received 'MeasConfig' IE for monitoring whether or not a condition defined therein is met. Then, in step s407, the mobile telephone 3 confirms that the measurement reconfiguration has been successful by generating and sending an 'RRC Connection Reconfiguration Complete' message to the serving base station 5.

In step s409, the measurement module 45 performs the configured signal measurements for the cells identified in the 'MeasConfig' IE (including the UE-R cells). When the measurement module 45 determines that one of the conditions defined in the 'MeasConfig' IE has been met (i.e. one of the configured events has occurred), it informs the reporting module 47, which generates, in step s411, a report.

Next, in step s413, the mobile telephone 3 generates and sends an 'RRC Measurement Report' message to its serving base station 5, and includes in this message the measurement results for the configured cells including any UE-R cells and associated information identifying the cells to which the report relates. In particular, the 'RRC Measurement Report' message includes information indicative that (at least) one of the configured events (i.e. either one of Events A1 to B2 and/or R0 to R5) has occurred.

After the serving base station 5 has received the Measurement Report from the mobile telephone 3, the base station 5 (e.g. its handover control module 69) makes, in step s415, a handover decision for the mobile telephone 3 by selecting one of the cells included in the Measurement Report as the target cell to which the mobile telephone 3 will be handed over. Since the Measurement Report includes results for cells belonging to relaying mobile telephones as well (in case a corresponding event has occurred), the serving base station 5 will be able to select a target cell operated by one of the mobile telephones (UE-R)—such as 'R-Cell 3' or 'R-Cell 4'.

Finally, in step s417, the base station 5 and the mobile telephone 3 perform the handover procedures to the target cell, i.e. the mobile telephone 3 detaches from base station 5 and re-attaches to the new base station or the UE-R associated with the cell selected in step s415.

Using the UE-R specific measurement events R0 to R5, the communication network can differentiate UE Relays from base stations (or relay nodes) for planning, deployment, customization, mobility, and load balancing purposes.

For example, the received/transmitted power in UE-R cells would not be within the same range as in base station cells (or relay node cells) and these cells might provide a significantly smaller coverage area than conventional cells, the time to trigger handover to UE-R cells might need to be quite different than in case of 'normal' cells.

Using the above UE-R specific triggers, the communication network 1 is able to differentiate between handover performed to a base station cell and handover performed to an UE-R cell, and thus prevent signal loss arising from incorrectly timed handover or incorrectly selected handover target cell. The suggested measurements might also result in a reduced power consumption for the relayed mobile telephones. The suggested measurements might also help for dealing with situations where there is a network malfunction or a lack of 'normal' neighbour cells (e.g. indoor environments, tunnels, highroads or geographical obstacles as hills or valleys).

<Events R0, R1, and R3>

Figure 5:
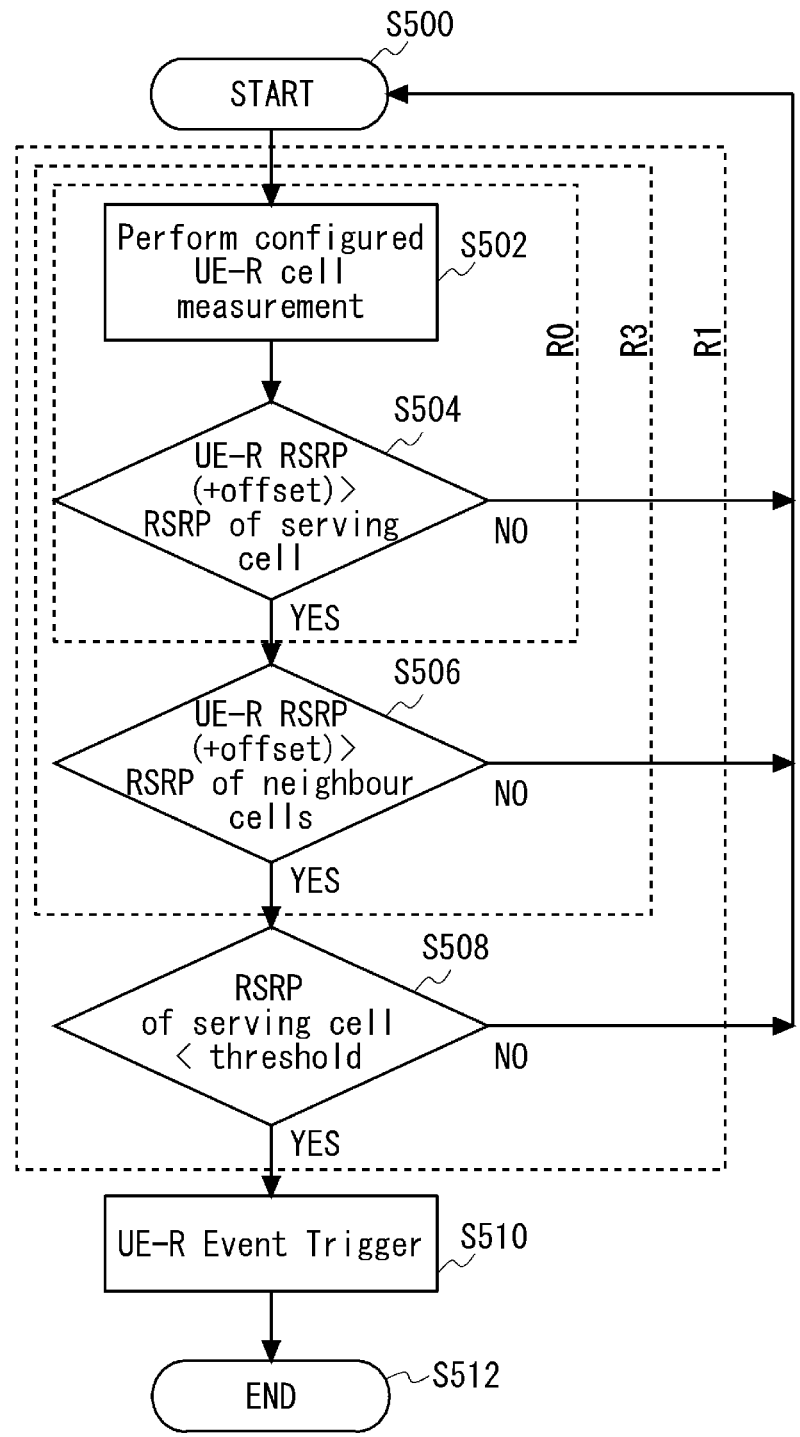
FIG. 5 is a flowchart illustrating a process performed by a mobile telephone when performing cell signal measurements and reporting with respect to a cell operated by another mobile telephone configured to work as a relay device.

FIG. 5 is a flowchart illustrating a process performed by a mobile telephone 3 when performing cell signal measurements and reporting with respect to a cell operated by another mobile telephone configured to work as a relay. The flow chart, as a whole, shows triggering of the R1 event.

The process begins at step s500, i.e. after the mobile telephone 3 has received the configuration parameters from its serving base station 5 and has set up its measurement module 45 accordingly (as specified in the received 'MeasConfig' IE provided by the serving base station 5).

In step s502, the measurement module 45 performs the configured signal measurements, including measurement of RSRP of any UE-relay cells the mobile telephone 3 can detect (or has been configured to measure). When the measurement results are available, the measurement module 45 checks, in step s504, whether the measured RSRP of the UE-R cell (plus an offset value) is greater than the RSRP of the current serving cell. If the measurement module determines that the measured RSRP of the UE-R cell (plus an offset value) is greater than the RSRP of the current serving cell (outcome: 'YES'), then it proceeds to step s506. However, if the measurement module determines that the measured RSRP of the UE-R cell (plus an offset value) is not greater than the RSRP of the current serving cell (outcome: 'NO'), then it deems that handover is not required and therefore returns to step s500 to re-start the process when new measurements are due (as specified by the measurement configuration).

In step s506, the measurement module 45 also checks whether the measured RSRP of the UE-R cell (plus an offset value) is greater than the RSRP of the neighbour cells. If the measurement module determines that the measured RSRP of the UE-R cell (plus an offset value) is greater than the RSRP of the neighbour cells (outcome: 'YES'), then it proceeds to step s508. However, if the measurement module determines that the measured RSRP of the UE-R cell (plus an offset value) is not greater than the RSRP of the neighbour cells (outcome: 'NO'), then it deems that handover is not required and therefore returns to step s500 to re-start the process when new measurements are due.

Next, in step s508, the measurement module 45 checks whether the RSRP of the serving cell is below a predetermined threshold. If the measurement module determines that the RSRP of the serving cell is below the predetermined threshold (outcome: 'YES'), then it proceeds to step s510, in which a corresponding UE-R Event is triggered. However, if the measurement module determines that the RSRP of the serving cell is not below the predetermined threshold (outcome: 'NO'), then it deems that handover is not required and therefore returns to step s500 to re-start the process when new measurements are due.

If all three conditions are fulfilled, i.e. all of steps s504, s506, and s508 return a 'YES' outcome, the measurement module 45 forwards the measurement results to the reporting module 47, which will generate a corresponding event report for sending to the serving base station 5. After the event report has been sent to the serving base station 5, the mobile telephone 3 ends the process and awaits instructions from the base station 5 to handover to a selected target cell, e.g. the UE-R cell measured. In the absence of such handover instructions, the cell measurements continue according to the existing configuration and the process will restart at step s500 (or alternatively, any event report is re-transmitted to the base station after a delay).

As shown in FIG. 5, the 'YES' outcome at each one of steps s504, s506, and s508 correspond to the UE-R specific event R1.

It will be appreciated that, whilst not shown in FIG. 5, when event R3 has been configured, if both s504 and s506 return a 'YES' outcome, the mobile telephone 3 triggers an R3 event (at step s510).

Similarly, whilst not shown in FIG. 5, if event R0 has been configured, in the case of a 'YES' outcome at step s504, the mobile telephone 3 reports the occurrence of the configured R0 event to the serving base station 5 (i.e. by triggering an R0 event at step s510).

It will be appreciated however, that more than one event might be configured for the mobile telephone 3 (e.g. all three of Events R0, R1, and R3 and/or any further events), and thus more than one UE-R trigger events might be generated and reported, depending on the outcome of the checks performed at steps s504, s506, and s508.

If more than one UE-R trigger events are detected, they might be reported to the serving base station 5 using a single measurement report or using separate measurement reports. Furthermore, UE-R events (i.e. Events R0 to R5) might be reported either together with events relating to 'normal' base station cells (i.e. Events A1 to B2) or they might be reported separately.

<Event R2>

Figure 6:
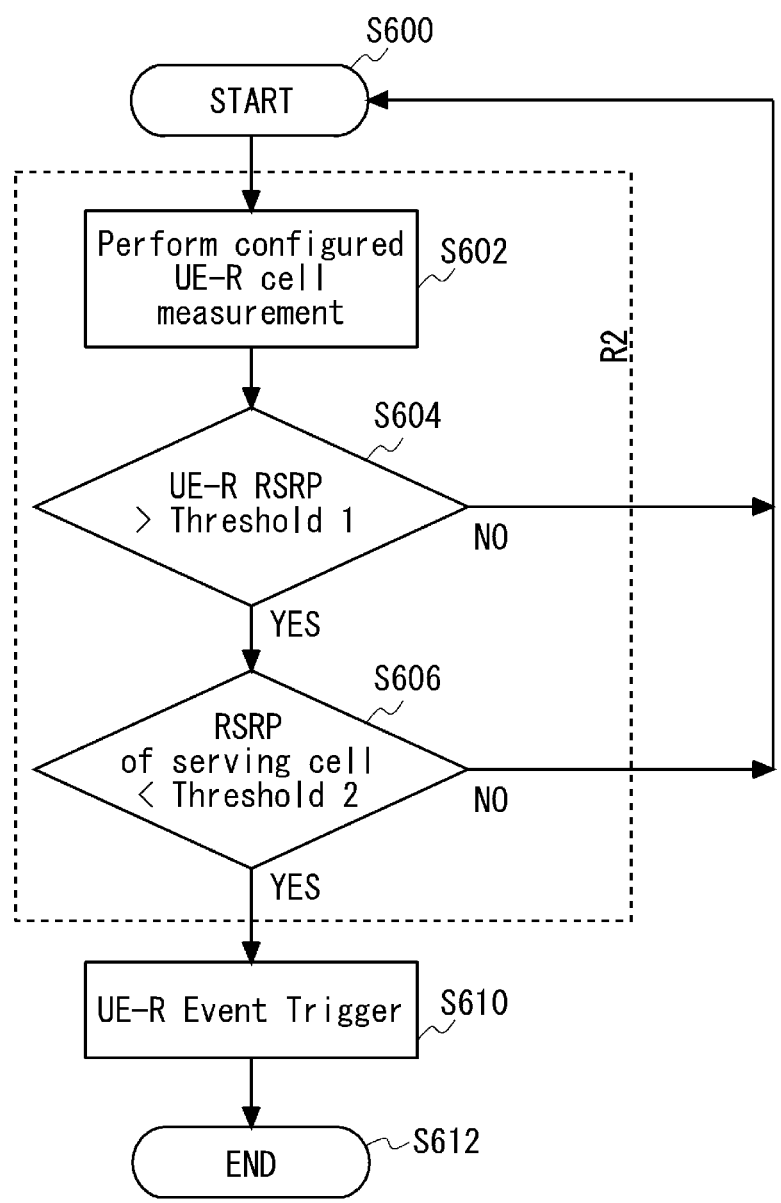
FIG. 6 is a flowchart illustrating another process performed by a mobile telephone when performing cell signal measurements and reporting with respect to a cell operated by another mobile telephone configured to work as a UE relay.

FIG. 6 is a flowchart illustrating another process performed by a mobile telephone 3 when performing cell signal measurements and reporting with respect to a cell operated by another mobile telephone configured to work as a UE relay. In particular, this example relies on comparing measured RSRP values to predetermined threshold values, by using Event R2 as an example.

The process begins at step s600, i.e. after the mobile telephone 3 has received the configuration parameters from its serving base station 5 and has set up its measurement module 45 accordingly (as specified in the received 'MeasConfig' IE provided by the serving base station 5).

In step s602, the measurement module 45 performs the configured signal measurements, including measurement of RSRP of any UE-relay cells the mobile telephone 3 can detect (or has been configured to measure). When the measurement results are available, the measurement module 45 checks, in step s604, whether the measured RSRP of the UE-R cell is greater than a first predetermined threshold value. If the measurement module determines that the measured RSRP of the UE-R cell is greater than the first predetermined threshold value (outcome: 'YES'), then it proceeds to step s606. However, if the measurement module determines that the measured RSRP of the UE-R cell is not greater than the first predetermined threshold value (outcome: 'NO'), then it deems that handover is not required and therefore returns to step s600 to re-start the process when new measurements are due.

In step s606, the measurement module 45 also checks whether the RSRP of the serving cell is smaller than a second predetermined threshold value. If the measurement module determines that the RSRP of the serving cell is smaller than a second predetermined threshold value (outcome: 'YES'), then it proceeds to step s610, in which a corresponding UE-R Event is triggered. However, if the measurement module determines that the RSRP of the serving cell is not smaller than the second predetermined threshold value (outcome: 'NO'), then it deems that handover is not required and therefore returns to step s600 to re-start the process when new measurements are due.

If both conditions are fulfilled, i.e. both steps s604 and s606 result in a 'YES' outcome, the measurement module 45 forwards the measurement results to the reporting module 47, which will generate a corresponding event report for sending to the serving base station 5. After the event report has been sent to the serving base station 5, the mobile telephone 3 ends the process and awaits instructions from the base station 5 to handover to a selected target cell, e.g. the UE-R cell measured. In the absence of such handover instructions, the cell measurements continue according to the existing configuration and the process will restart at step s600 (or alternatively, the event report is re-transmitted to the base station after a delay).

<Triggers for events R0, R1, and R3>

Figure 7:
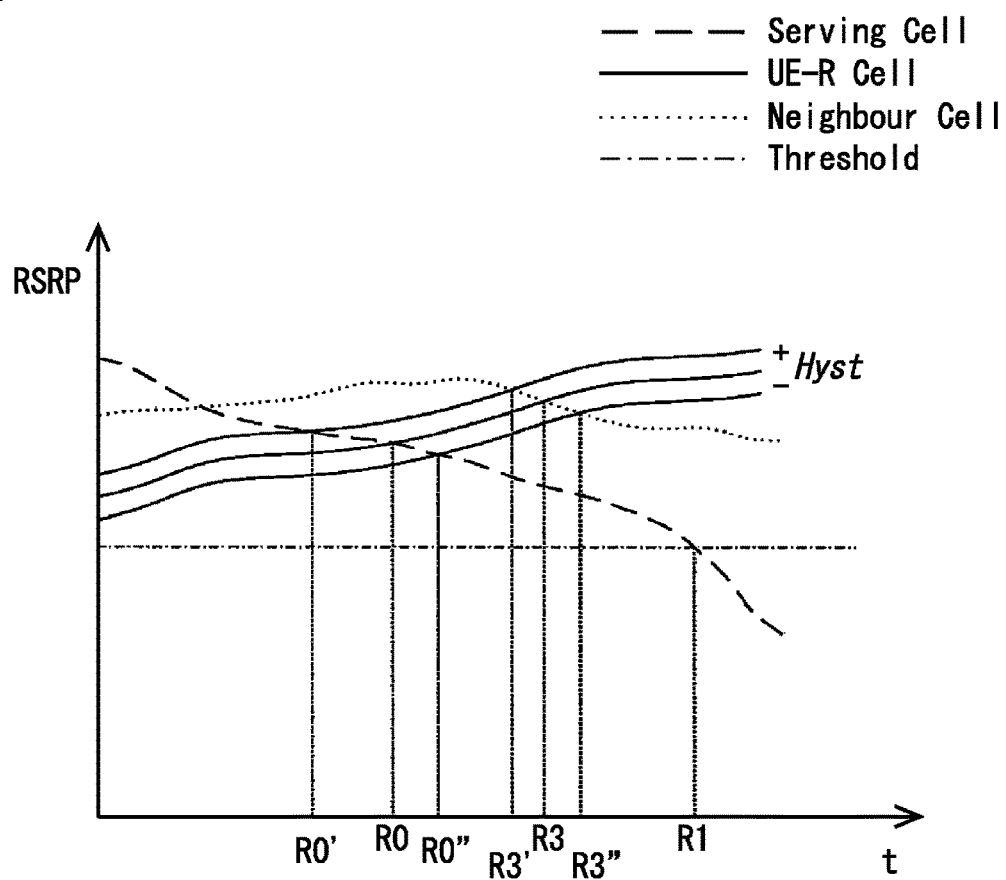
FIG. 7 is a graph illustrating the changes in signal strengths over time as measured by the mobile telephone shown in FIG. 1.

FIG. 7 is a graph illustrating the changes in signal strengths of various cells over time as measured by the mobile telephone 3 shown in FIG. 1. In particular, FIG. 7 illustrates the relation between handover criteria according to configured measurement events R0, R1, and R3 when the offset value is chosen to be zero.

As shown, different events cause the mobile telephone 3 initiating handover at different signal levels (and hence at different points in time). For example, in case of Event R0, handover might begin already when the signal level (RSRP) of the serving cell is still relatively high, as in this case the only condition taken into account is whether or not the RSRP of the UE-R cell is higher than the RSRP of the serving cell. In some situations, this might result in handing over the mobile telephone 3 to an UE-R cell too early, although this might be desired, for example, for load balancing reasons.

In case of Event R3, handover to an UE-R cell does not begin until the measured RSRP of the UE-R cell is higher than the respective RSRP of both the serving cell and any (other) neighbour cells. In this case, 'normal' base station cells might be given priority over UE-R cells unless an UE-R provides better signal conditions than other cells.

Finally, Event R1 results in handover at an even later point in time (and at a corresponding lower RSRP level of the current serving cell) because in this case a third condition (RSRP of serving cell falling below a threshold) has to be met as well. Of course, by increasing or decreasing the threshold value, the base station can fine-tune handover trigger by the mobile telephone 3. When configuring Event R1 with a relatively low threshold level, the serving base station 5 can avoid frequent handovers for mobile telephones 3 within its cell whilst it may also ensure that when a handover becomes necessary, an UE-R cell can be selected if it provides better signal conditions than any other neighbour cell.

As mentioned above, hysteresis might be applied, which would effectively make the 'entering condition' for a UE-R cell harder to meet than a corresponding 'leaving condition'. FIG. 7 illustrates two of such 'entering conditions' (R0" and R3") and corresponding 'leaving conditions' (R0' and R3') wherein the 'entering condition' for a UE-R cell requires higher RSRP than the corresponding 'leaving condition'. This ensures that once a mobile telephone is handed over to (enters) an UE-R cell, it will not leave this cell until the signal quality becomes much worse than at the time of entering the cell.

<Trigger for event R2>

Figure 8:
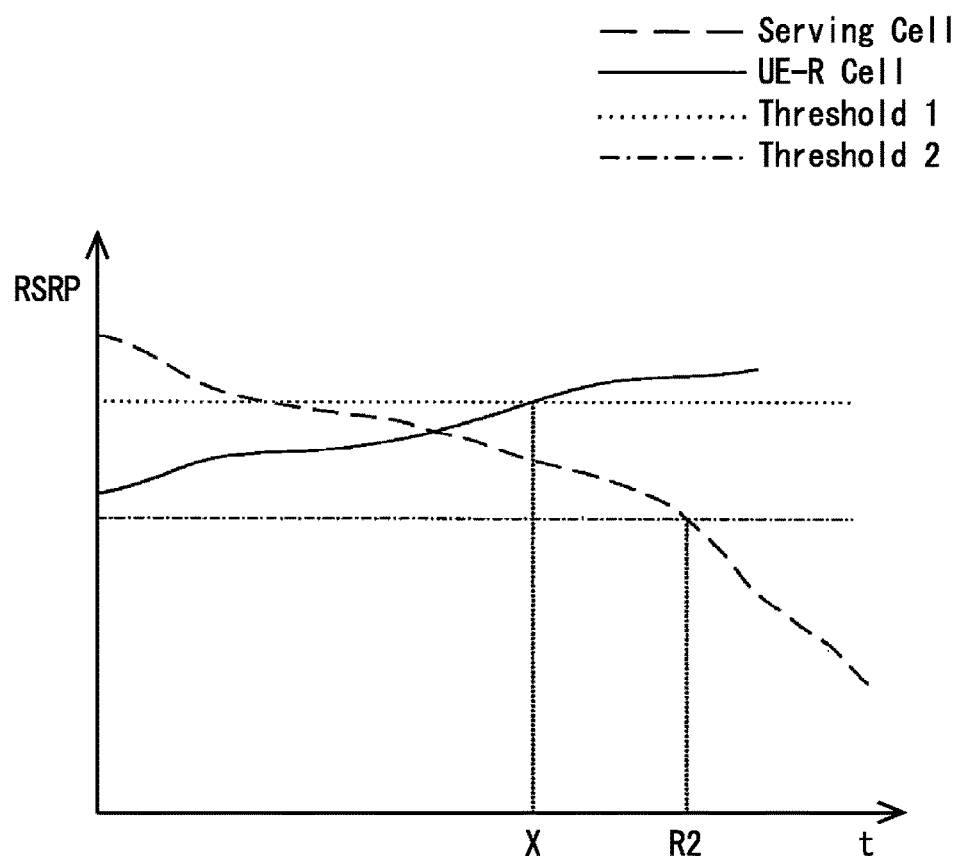
FIG. 8 is another graph illustrating the changes in signal strengths of a serving cell and a UE-Relay cell over time as measured by the mobile telephone shown in FIG. 1.

FIG. 8 is a graph illustrating the changes in signal strengths of a serving cell and a UE-Relay cell over time as measured by the mobile telephone 3 shown in FIG. 1. In particular, FIG. 8 illustrates the handover criteria according to a configured 'entering condition' of measurement event R2. As described earlier with reference to FIG. 6, the trigger conditions for Event R2 are that i) RSRP (minus Hyst) of the UE-R cell is greater than a first threshold (which is met at point marked 'X' in FIG. 8) and ii) that RSRP (plus Hyst) of the serving cell falls below a second threshold (which second condition is only met at the point marked 'R2').

<Applying Hysteresis>

Figure 9:
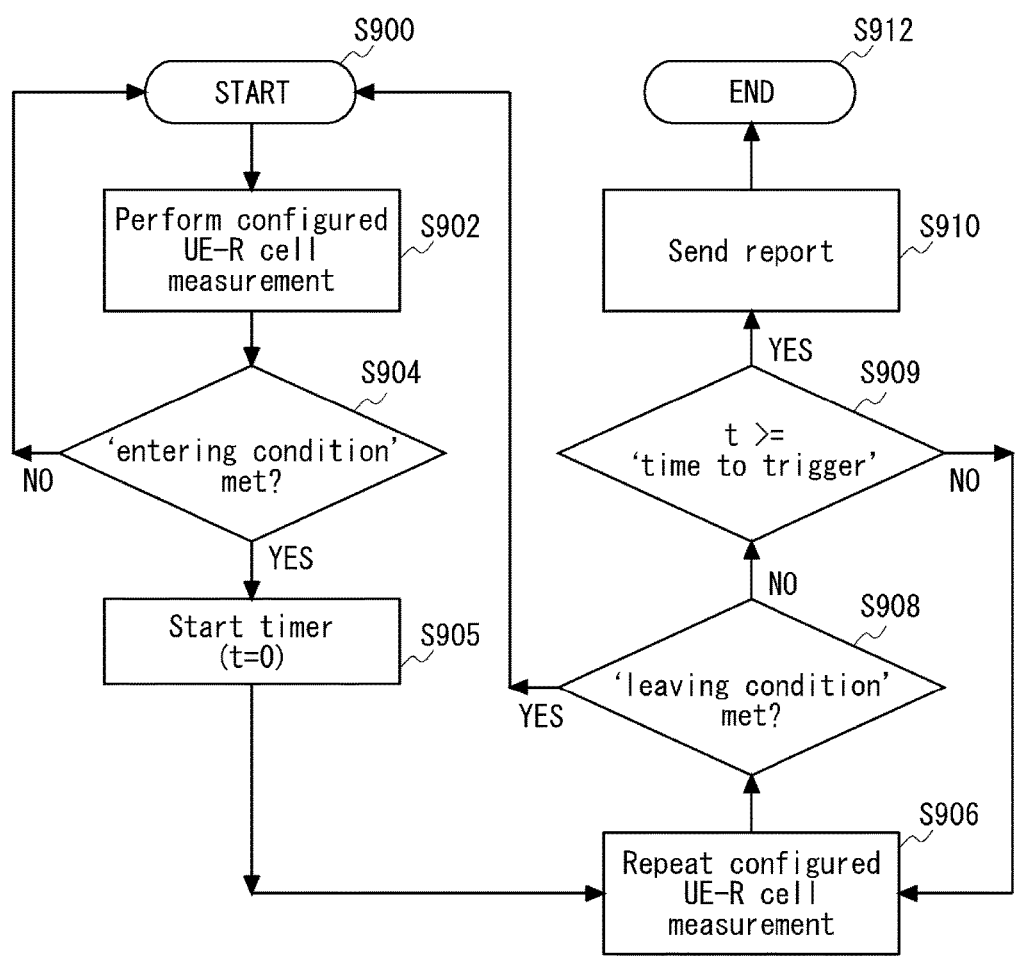
FIG. 9 illustrates a mechanism taking into account different entering and leaving conditions that result from application of hysteresis.

FIG. 9 illustrates a mechanism which takes into account different entering and leaving conditions that result from application of hysteresis. In particular, this mechanism includes checking both the entering and leaving conditions (and applying a 'time to trigger' parameter) before reporting the occurrence of an event to the serving base station.

Advantageously, the 'time to trigger' parameter of this alternative might be different from the time to trigger reporting of 'normal' cells. In particular, after an 'entering condition' is met for a cell (at step s904), the mobile telephone 3 verifies whether or not the given cell provides sufficiently stable signal conditions to qualify as a handover target cell. Therefore, when the 'entering condition' is initially met (step s904: YES), the mobile telephone 3 starts a timer (at steps s905) and performs further measurement(s) with respect to this cell (step s906). After this, the mobile telephone 3 checks (at step s908) whether or not the repeated measurements indicate that 'leaving condition' would have been met for the measured cell. If the 'leaving condition' is still not met until the expiry of the configured timer (step s909), the mobile telephone reports the cell to the network as a qualifying handover target cell. However, if the measured signal conditions deteriorate after the first measurement (step s902) but before the 'time to trigger' condition is met (step s909) such that the leaving conditions are fulfilled, the mobile telephone 3 does not send report to the network.

This alternative might beneficially reduce 'ping pong' type effects and signalling between the mobile telephone 3 and the network 1.

<Modifications and Alternatives>

Detailed embodiments have been described above. As those skilled in the art will appreciate, a number of modifications and alternatives can be made to the above embodiments whilst still benefiting from the inventions embodied therein.

The UE Relays (mobile telephones operating as relays) described above broadcast radio information that can be measured by the mobile telephone to be handed over, for example, a reference signal (CRS/CSI-RS) or the like. Preferably, UE Relays also broadcast their own cell identifier or other information that informs the mobile telephone taking the measurements that the measured cell is operated by a relaying mobile telephone. However, since the suggested measurement events R0 to R5 address UE-R cells, the information that the measured cell is an UE-R cell might be provided implicitly by the serving base station by configuring either one of Events R0 to R5.

In the above embodiments, Events R0 to R5 are described as requiring measurements of the RSRP of the UE-R cell, the serving cell, and the neighbour cell. However, it will be appreciated that measurements of RSRQ or RSCP or measurement of multiple quantities are also possible. This would beneficially allow configuring inter-RAT measurements (i.e. Events B1/B2) in case the UE-R Cell uses other Radio Access Technology (RAT) than the serving base station. In some cases, RSRP might be measured for some cells, whilst RSRQ and/or RSCP might be measured for other cells.

In the above embodiments, Events R0 to R5 are described to take into account various offset and/or threshold values. An offset value might be defined as any of the values 'Ofn', 'Ocn', 'Ofp', 'Ocp', and 'Off' specified in 3GPP TS 36.331. It will be appreciated however, that various combinations and alternatives are possible, such as, for example:

an offset value might be a suitable combination of any of 'Ofn', 'Ocn', 'Ofp', 'Ocp', and 'Off' (and/or any other offset values);

different events might have different specified (single or combined) offset values.

For example, in case of using an offset value, the offset value might be applicable to all conditions or only to some of the conditions. Moreover, hysteresis might also be applied to all conditions or only to some of the conditions. In some cases, different hysteresis values might be used for specifying an 'entering condition' and a corresponding 'leaving condition'. In all examples, thresholds values might be the same for the serving cell and neighbour cell(s). However, it is also possible to configure different thresholds for the serving and the neighbour cell(s).

A 'handover timer' parameter might be configured to define the maximum time that may elapse between taking the measurements and initiating a handover (to a UE-R cell). Beneficially, such 'handover timer' might take into account the different requirements for UE-R cell based mobility than normal (i.e. eNB/RN based) mobility.

Moreover, any of Events R0 to R5 might be specified such that an entering or leaving condition needs to be met for a minimum duration of time (or for a minimum number of consecutive measurements) before they get reported to the serving base station. This will beneficially ensure that handover will not be triggered immediately upon detecting an increase or decrease in signal quality within a measured UE-R cell but only when the changed signal conditions still meet the trigger condition after the minimum amount of time has passed or after the minimum number (e.g. more than one) of measurements have been made on those signals. This way frequent handovers (e.g. due to fluctuations in the quality of signals transmitted by the measured UE Relay) can be avoided.

It will also be appreciated that either one of the hysteresis, offset, time to trigger values might be a positive or a negative value, or zero. Further, the comparison (e.g. at steps s508, s604, and s606) can be defined as "less (or equal) than a threshold" or "higher (or equal) than a threshold".

The serving base station might configure the same offset and/or time to trigger values for all mobile telephones within its cell(s) or might configure a different offset and/or time to trigger value for each mobile telephone (or group of mobile telephones).

It will also be appreciated that distinct triggers can be defined for an "entering" condition (i.e. handover to an UE-R cell) and a "leaving" condition (i.e. handover from an UE-R cell). However, it is also possible to define the same triggers for both the "entering" condition and the "leaving" condition for an UE-R cell or use only one of them.

Some possible events are described above, which take into account signal conditions in an UE Relay cell. However, it will be appreciated that the configured events might take into account signal conditions in more than one UE Relay cell.

For example, in any of the above defined events, an additional condition relating to other UE-Relays might be included. This might be beneficial in cases when the network needs to compare the RSRP of a candidate UE-Relay with that of other candidate UE-Relays. For example, using the example of Event R0, the entering condition might be defined as follows: ((UE-R RSRP+an offset value−Hyst) >RSRP of serving cell) and (UE-R RSRP+an offset value−Hyst)>RSRP of other UE-R(s))). A corresponding leaving condition might be defined as: ((UE-R RSRP+an offset value+Hyst)<RSRP of serving cell) and (UE-R RSRP+an offset value+Hyst)<RSRP of other UE-R(s)).

Alternatively, any of the above described events might be configured using "RSRP of other UE-Relay(s)" instead of "RSRP of neighbour cell(s)". In this case, the mobile telephone will be beneficially able to compare the signal conditions offered by its candidate UE-Relay with other candidate UE-Relays. For example, based on Event R1, an entering condition might be defined as: (((UE-R RSRP+an offset value−Hyst)>RSRP of serving cell) and ((UE-R RSRP+an offset value−Hyst)>RSRP of other UE-R(s)) and (RSRP serving cell+Hyst<a threshold)). A corresponding leaving condition might be defined as: (((UE-R RSRP+an offset value+Hyst)<RSRP of serving cell) and ((UE-R RSRP+an offset value+Hyst)<RSRP of other UE-R(s)) and (RSRP serving cell−Hyst>a threshold)).

In the above embodiments, communications protocols and interfaces conforming to the 3GPP LTE standards are described, thus a 'UER-Uu' interface (which might be similar to an 'RN-Uu' interface) is provided between the UE Relay and the mobile telephone to be relayed. However, it will be appreciated that the use of other communication standards is also possible.

For example, the link provided between the UE Relay and the mobile telephone to be relayed might use any 3GPP technologies, such as GSM, UMTS, LTE, and the like. Alternatively, a different (e.g. non-3GPP) communication technology might be used, such as Wi-Fi, CDMA, WiMAX, and the like. If the mobile telephone also supports other technologies than LTE (e.g. 3GPP technologies such as UMTS & HSPA or non-3GPP technologies such as WiFi, WiMAX, CDMA) its transceiver circuit and communications control module might be implemented differently than described above.

When measuring LTE cells, the mobile telephone might measure the value of, for example, RSRP and/or RSSI and/or RSRQ. In case of cells implementing a different wireless standard (e.g. CDMA), other parameters might be measured, such as RSCP.

In the above embodiments, the configuration data comprises trigger events specific for UE Relays (which are mobile telephones operating in a relaying mode). However, it will be appreciated that such trigger events are also applicable to other types of relaying devices, e.g. conventional relay nodes and the like.

When the configuration generated by the base station (at step s401) is of a periodic type and when configuration parameters are different from the previous configuration sent to the UE, the configuration data is re-sent (i.e. step s403). The configuration data may define the required periodicity of the measurements to be performed by the mobile telephone (i.e. step s409 is repeated at predefined intervals).

The configuration data may also define the required periodicity of the measurement reports to be sent from the mobile telephone to the base station (i.e. step s413 is repeated at predefined intervals).

Some events might be particularly beneficial in situations when handover to base station cells is to be avoided (for example, for load balancing reasons). In case of configuring Event R4 for a particular mobile telephone without configuring measurements for neighbour base station cells, only the serving cell and a candidate UE-Relay cell is measured. This may result in a faster reporting and handover procedure.

Event R5 might also be particularly beneficial for load balancing (i.e. when a base station is seeking to reduce usage of certain frequency(-ies) or to re-use a certain frequency as a lower power UE-R cell). It can also be used for spectrum aggregation from a UE-R cell and from the serving eNB cell.

It will be appreciated that the base station will be able to determine which mobile telephones support relaying functionality, e.g. by receiving information regarding the mobile telephones' capabilities either from the HSS, the MME, or the mobile telephones themselves. This information can be used to compute the list for configuring measurements of neighbour UE-R.

Similarly, the base station will also be able to determine which mobile telephones are capable of receiving relayed data via an UE Relay. This capability might also be determined based on information received from the HSS, the MME, or the mobile telephones themselves. Beneficially, the base station will only configure Events R0 to R5 for a particular mobile telephone after it has verified that this mobile telephone is capable of receiving relayed data. For mobile telephones not capable of receiving relayed data (via UE Relays) the base station will not configure Events R0 to R5—although it might still configure Events A1 to B2 with respect to UE Relay cells but it will not initiate handover to such cells for mobile telephones not capable of receiving relayed data (via UE Relays). For these mobile telephones, the base station will select a handover cell that is operated by a base station or a conventional relay node even if the received measurement report indicates that UE-R cells provide better signal conditions.

In the above embodiments, the base station configured measurement data using RRC signalling. However, it will be appreciated that other type of signalling might also be used. For example, measurement configuration (including Events R0 to R5) may be sent via dedicated RRC signalling or non-dedicated RRC signalling such as system broadcast and the like. However, it will be appreciated that other type of signalling might also be used. The configuration data might be specific for each mobile telephone (or groups of mobile telephones) or might be common for all mobile telephones within the cell(s) of the base station or within the whole communication network.

In the above embodiments, a mobile telephone based telecommunication system was described. As those skilled in the art will appreciate, the signalling techniques described in the present application can be employed in other communication systems. Although the above embodiments described mobile telephones as examples of user equipment, other communication nodes or mobile communication devices may also be used for example, personal digital assistants, laptop computers, web browsers, e-book readers, personal computers implementing 3GPP technology, machine type communication (MTC) devices, modem devices included in routers (e.g. a MIFI—LTE WIFI router), etc. may be used without departing from the scope of the invention.

In the embodiments described above, the mobile telephones and the base stations will each include transceiver circuitry. Typically this circuitry will be formed by dedicated hardware circuits. However, in some embodiments, part of the transceiver circuitry may be implemented as software run by the corresponding controller.

In the above embodiments, a number of software modules were described. As those skilled in the art will appreciate, the software modules may be provided in compiled or un-compiled form and may be supplied to the base station or the relay station as a signal over a computer network, or on a recording medium. Further, the functionality performed by part or all of this software may be performed using one or more dedicated hardware circuits.

Various other modifications will be apparent to those skilled in the art and will not be described in further detail here.

Summary of measurement events defined in 3GPP TS 36.331

<5.5.4.2 Event A1 (Serving becomes better than threshold)>
Inequality A1-1 (Entering condition)
Ms−Hys>Thresh
Inequality A1-2 (Leaving condition)
Ms+Hys<Thresh
<5.5.4.3 Event A2 (Serving becomes worse than threshold)>
Inequality A2-1 (Entering condition)
Ms+Hys<Thresh
Inequality A2-2 (Leaving condition)
Ms−Hys>Thresh
<5.5.4.4 Event A3 (Neighbour becomes offset better than PCell)>
Inequality A3-1 (Entering condition)
Mn+Ofn+Ocn−Hys>Mp+Ofp+Ocp+Off
Inequality A3-2 (Leaving condition)
Mn+Ofn+Ocn+Hys<Mp+Ofp+Ocp+Off <5.5.4.5 Event A4 (Neighbour becomes better than threshold)>
Inequality A4-1 (Entering condition)
Mn+Ofn+Ocn−Hys>Thresh
Inequality A4-2 (Leaving condition)
Mn+Ofn+Ocn+Hys<Thresh
<5.5.4.6 Event A5 (PCell becomes worse than threshold1 and neighbour becomes better than threshold2)>
Inequality A5-1 (Entering condition 1)
Mp+Hys<Thresh1
Inequality A5-2 (Entering condition 2)
Mn+Ofn+Ocn−Hys>Thresh2
Inequality A5-3 (Leaving condition 1)
Mp−Hys>Thresh1
Inequality A5-4 (Leaving condition 2)
Mn+Ofn+Ocn+Hys<Thresh2
<5.5.4.6a Event A6 (Neighbour becomes offset better than SCell)>
Inequality A6-1 (Entering condition)
Mn+Ocn−Hys>Ms+Ocs+Off
Inequality A6-2 (Leaving condition)
Mn+Ocn+Hys<Ms+Ocs+Off
5.5.4.7 Event B1 (Inter RAT neighbour becomes better than threshold)
Inequality B1-1 (Entering condition)
Mn+Ofn−Hys>Thresh
Inequality B1-2 (Leaving condition)
Mn+Ofn+Hys<Thresh
<5.5.4.8 Event B2 (PCell becomes worse than threshold) and inter RAT neighbour becomes better than threshold2)>
Inequality B2-1 (Entering condition 1)
Mp+Hys<Thresh1
Inequality B2-2 (Entering condition 2)
Mn+Ofn−Hys>Thresh2
Inequality B2-3 (Leaving condition 1)
Mp−Hys>Thresh1
Inequality B2-4 (Leaving condition 2)
Mn+Ofn+Hys<Thresh2
Wherein:
'Ms' is the measurement result of the serving cell, not taking into account any cell individual offset
'Mn' is the measurement result of the neighbouring cell, not taking into account any offsets.
'Ofn' is the frequency specific offset of the frequency of the neighbour cell (i.e. offsetFreq as defined within measObjectEUTRA corresponding to the frequency of the neighbour cell).
'Ocn' is the cell specific offset of the neighbour cell (i.e. cellIndividualOffset as defined within measObjectEUTRA corresponding to the frequency of the neighbour cell), and set to zero if not configured for the neighbour cell.
'Mp' is the measurement result of the PCell, not taking into account any offsets.
'Ofp' is the frequency specific offset of the primary frequency (i.e. offsetFreq as defined within measObjectEUTRA corresponding to the primary frequency).
'Ocp' is the cell specific offset of the PCell (i.e. cellIndividualOffset as defined within measObjectEUTRA corresponding to the primary frequency), and is set to zero if not configured for the PCell.
'Hys' is the hysteresis parameter for this event (i.e. hysteresis as defined within reportConfigEUTRA for this event).
'Off' is the offset parameter for this event (i.e. a3-Offset as defined within reportConfigEUTRA for this event).

'Mn', 'Mp' are expressed in dBm in case of RSRP, or in dB in case of RSRQ.

'Ofn', 'Ocn', 'Ofp', 'Ocp', 'Hys', 'Off' are expressed in dB.

(Supplementary Note 1)

A communication device for providing measurement reports to a communication network comprising a plurality of cells, the communication device comprising:

means for connecting to a cell, of said plurality of cells, for sending and receiving user data;

means for receiving configuration data for configuring measurements in at least one of said plurality of cells wherein said configuration data defines at least one relay specific trigger event for triggering measurement reporting for at least one relay cell operated by a relay device for a base station;

means for performing measurements, based on said received configuration data, in said at least one relay cell;

means for determining whether or not said relay specific trigger event has occurred based on results of said measurements; and means for sending a measurement report, to the communication network, when said trigger event has been determined to have occurred.

(Supplementary Note 2)

The communication device according to Supplementary note 1 wherein said at least one relay cell comprises a candidate cell for potential handover to said cell.

(Supplementary Note 3)

The communication device according to Supplementary note 1 or 2 wherein said configuration data defines a condition for a trigger event which occurs when a result of said measurements meets or exceeds a threshold value.

(Supplementary Note 4)

The communication device according to any one of Supplementary notes 1 to 3 wherein said configuration data defines a condition for a trigger event which occurs when a result of said measurements meets or falls below a (or a further) threshold value.

(Supplementary Note 5)

The communication device according to Supplementary note 3 or 4 wherein the or each threshold comprises a value provided in said configuration data.

(Supplementary Note 6)

The communication device according to any one of Supplementary notes 1 to 5 wherein said configuration data defines a condition for a trigger event which occurs when a result of said measurements meets or exceeds a result of a corresponding measurement for a further of said plurality of cells.

(Supplementary Note 7)

The communication device according to any one of Supplementary notes 1 to 6 wherein said configuration data defines a condition for a trigger event which occurs when a result of said measurements meets or falls below a result of a corresponding measurement for a further (or yet further) of said plurality of cells.

(Supplementary Note 8)

The communication device according to any one of Supplementary notes 3 to 7 wherein said configuration data defines at least one hysteresis (and/or offset) value defining an extent to which a result of said measurement should exceed or fall below a threshold or corresponding measurement for a further of said plurality of cells for an event to be triggered.

(Supplementary Note 9)

The communication device according to any one of Supplementary notes 1 to 8 wherein said results of said measurements comprise a measure of signal conditions of said source cell.

(Supplementary Note 10)

The communication device according to Supplementary note 9 wherein said configuration data defines an entry condition for a trigger event which occurs when signal conditions in said at least one relay cell are better than signal conditions in a cell in which said communications device is currently connected.

(Supplementary Note 11)

The communication device according to Supplementary note 9 or 10 wherein said configuration data further defines an entry condition for a trigger event which occurs when: (a) signal conditions in said at least one relay cell are better than signal conditions in a cell in which said communications device is currently connected; and (b) signal conditions in said at least one relay cell are better than signal conditions in a non-relay neighbour cell.

(Supplementary Note 12)

The communication device according to any one of Supplementary notes 9 to 11 wherein said configuration data further defines an entry condition for a trigger event which occurs when: (a) signal conditions in said at least one relay cell are better than signal conditions in a cell in which said communications device is currently connected; (b) signal conditions in said at least one relay cell are better than signal conditions in a non-relay neighbour cell; and (c) signal conditions in the current cell fall below a threshold value.

(Supplementary Note 13)

The communication device according to any one of Supplementary notes 9 to 12 wherein said configuration data defines an entry condition for a trigger event which occurs when: (a) signal conditions in said at least one relay cell are better than a first threshold value; and (b) signal conditions in a cell in which said communications device is currently connected fall below a second threshold.

(Supplementary Note 14)

The communication device according to Supplementary note 13 wherein said configuration data defines an entry condition for a trigger event which occurs when: (c) signal conditions in a neighbouring cell also fall below said second threshold.

(Supplementary Note 15)

The communication device according to any one of Supplementary notes 9 to 13 wherein said configuration data further defines an entry condition for a trigger event which occurs when: (a) signal conditions in said at least one relay cell are better than signal conditions in a cell in which said communications device is currently connected; and (b) signal conditions in a non-relay neighbour cell fall below a threshold value.

(Supplementary Note 16)

The communication device according to any one of Supplementary notes 9 to 13 wherein said configuration data defines an entry condition for a trigger event which occurs when: (a) signal conditions in said at least one relay cell are better than signal conditions in a non-relay neighbour cell.

(Supplementary Note 17)

The communication device according to any one of Supplementary notes 1 to 16 wherein said results of said measurements comprise a measure of at least one of: a reference signal receive power 'RSRP'; a reference signal receive quality 'RSRQ'; a received signal strength indicator 'RSSI'; and a received signal code power 'RSCP'.

(Supplementary Note 18)
The communication device according to any one of Supplementary notes 1 to 17 wherein said configuration data defines a periodic trigger event.

(Supplementary Note 19)
The communication device according to any one of Supplementary notes 1 to 18 wherein said configuration data comprises a hysteresis value to define different conditions for entering and leaving said at least one relay cell.

(Supplementary Note 20)
The communication device according to Supplementary note 19 wherein said configuration data comprises a timer value and defines a trigger event which occurs when: (a) said entering condition is met at the start of said timer; and (b) said leaving condition is not met whilst said timer is running (Supplementary Note 21)
The communication device according to any one of Supplementary notes 1 to 20 wherein said measurement report comprises an identification of said trigger event and an identification of said relay cell.

(Supplementary Note 22)
The communication device according to any one of Supplementary notes 1 to 21 wherein said measurement report comprises information on a received power level in said relay cell.

(Supplementary Note 23)
The communication device according to any one of Supplementary notes 1 to 22 wherein said relay device is a mobile communication device.

(Supplementary Note 24)
The communication device according to any one of Supplementary notes 1 to 23 further comprising means for receiving additional configuration data for configuring measurements in at least one further cell wherein said additional configuration data comprises at least one trigger event specific to base station cells.

(Supplementary Note 25)
The communication device according to any one of Supplementary notes 1 to 24 wherein said communication device is operable to receive said configuration data and/or send said measurement report using Radio Resource Control 'RRC' signalling.

(Supplementary Note 26)
The communication device according to any one of Supplementary notes 1 to 25 comprising means for operating the communication device as a relay device for relaying user data between said communication device and another communication device.

(Supplementary Note 27)
The communication device according to Supplementary note 26 wherein said means for operating the communication device as a relay device is operable to relay said user data via a non-LTE interface.

(Supplementary Note 28)
The communication device according to Supplementary note 26 wherein said means for operating the communication device as a relay device is operable to relay said user data via an LTE interface, such as a 'UER-Uu' interface.

(Supplementary Note 29)
The communication device according to Supplementary note 26 wherein said means for operating the communication device as a relay device is operable to relay said user data via a non-LTE interface such as any of an UMTS, HSPA, Wi-Fi, CDMA, or a WiMAX interface.

(Supplementary Note 30)
The communication device according to any one of Supplementary notes 1 to 29 comprising at least one of a mobile telephone, a personal digital assistant, a laptop computer, a web browser, and an e-book reader.

(Supplementary Note 31)
A base station for obtaining measurement reports from a communication device in a communication network comprising a plurality of cells, the base station comprising:
means for providing, to said communication device, configuration data for configuring measurements in at least one cell of said communication network wherein said configuration data defines at least one relay specific trigger event for triggering measurement reporting for at least one relay cell operated by a relay device for the or another base station; and
means for receiving a measurement report, from the communication device, the measurement report when the at least one relay specific trigger event has occurred.

(Supplementary Note 32)
The base station according to Supplementary note 31 further comprising means for selecting a handover target cell for said communication device based on said received measurement report.

(Supplementary Note 33)
The base station according to Supplementary note 31 or 32 comprising an E-UTRAN base station.

(Supplementary Note 34)
The base station according to any one of Supplementary notes 31 to 33 further comprising means for providing a 'UER-Un' interface between said base station and a communication device configured to operate as a relay device.

(Supplementary Note 35)
A base station for operating a cell in a communication network comprising a plurality of mobile communication devices, the base station comprising:
means for obtaining information indicating that at least one said mobile communication device is operating as a relay device that operates a relay cell; and
means for maintaining information identifying each said mobile communication device operating as a relay device.

(Supplementary Note 36)
The base station according to Supplementary note 35 further comprising means for generating configuration data, based on said maintained information, for configuring measurements for each relay cell operated by a mobile communication device at, wherein said configuration data defines at least one relay specific trigger event.

(Supplementary Note 37)
The base station according to Supplementary note 35 or 36 wherein said obtaining means is operable to obtain said information from said communication device operating said at least relay device cell or from another base station.

(Supplementary Note 38)
A system comprising the communication device according to any one of Supplementary notes 1 to 29 and the base station according to any one of Supplementary notes 31 to 34 and/or the base station according to Supplementary note 35 or 37.

(Supplementary Note 39)
A method performed by a communication device for providing measurement reports to a communication network comprising a plurality of cells, the method comprising:
connecting to a cell, of said plurality of cells, for sending and receiving user data;
receiving configuration data for configuring measurements in at least one of said plurality of cells wherein said configuration data defines at least one relay specific trigger event for triggering measurement reporting for at least one relay cell operated by a relay device for a base station;

performing measurements, based on said received configuration data, in said at least one relay cell;

determining whether or not said relay specific trigger event has occurred based on results of said measurements; and sending a measurement report, to the communication network, when said trigger event has been determined to have occurred.

(Supplementary Note 40)

A method performed by a base station for obtaining measurement reports from a communication device in a communication network comprising a plurality of cells, the method comprising:

providing, to said communication device, configuration data for configuring measurements in at least one cell of said communication network wherein said configuration data defines at least one relay specific trigger event for triggering measurement reporting for at least one relay cell operated by a relay device for the or another base station; and receiving a measurement report, from the communication device, when the at least one relay specific trigger event has occurred.

(Supplementary Note 41)

A method performed by a base station for operating a cell in a communication network comprising a plurality of mobile communication devices, the method comprising:

obtaining information indicating that at least one said mobile communication device is operating as a relay device that operates a relay cell; and maintaining information identifying each said mobile communication device operating as a relay device.

REFERENCE SIGNS LIST 1 telecommunications network
3 user equipment
5 base station
7 core network
31, 51 transceiver circuit
33, 53 antenna
35 user interface
37, 57 controller
39, 59 memory
41, 61 operating system
43, 63 communications control module
45 measurement module
47 reporting module
49 handover mudule
55 network interface
65 measurement config. module
67 UE-R cell module
69 handover control module

The invention claimed is:

1. A communication device for providing measurement reports to a communication network comprising a plurality of cells, the communication device comprising:

a processor configured to identify an occurrence of any of a plurality of possible trigger events including a plurality of type A trigger events, a plurality of type B trigger events, and at least one further type of trigger event that is different from said type A and type B trigger events; and a transceiver circuit configured to connect to a cell, of said plurality of cells, for sending and receiving user data, wherein the transceiver circuit is further configured to receive configuration data for configuring measurements in at least one of said plurality of cells wherein said configuration data defines the at least one further type of trigger event, that is different from said type A and type B trigger events, for triggering measurement reporting for measurements of channel state reference signals (CSI-RS) broadcast in at least one cell, wherein the at least one further type of trigger event for triggering measurement reporting that is different from said type A and type B trigger events is characterised by an entering condition and a leaving condition, wherein the entering condition is met when a measurement result for the CSI-RS, plus an offset value, and minus a hysteresis value exceeds a predetermined value, and the leaving condition is met when a measurement result for the CSI-RS, plus an offset value, and plus a hysteresis value is less than the predetermined value; wherein the processor is further configured to perform measurements, based on said received configuration data, in said at least one cell, wherein the processor is further configured to determine whether or not said at least one further type of trigger event that is different from said type A and type B trigger events has occurred based on results of said measurements, and the transceiver circuit is further configured to send a measurement report, to the communication network, when said at least one further type of trigger event that is different from said type A and type B trigger events has been determined to have occurred.

2. The communication device according to claim 1 wherein said at least one cell comprises a candidate cell for potential handover to said cell.

3. The communication device according to claim 1 wherein said configuration data defines said entering condition for a trigger event which occurs when said measurement result for the CSI-RS, plus an offset value, and minus a hysteresis value exceeds a threshold value.

4. The communication device according to claim 1, wherein said configuration data defines said leaving condition for a trigger event which occurs when said measurement result plus the offset value, and plus the hysteresis value falls below a threshold value.

5. The communication device according to claim 3, wherein the threshold value comprises a value provided in said configuration data.

6. The communication device according to claim 1 wherein said configuration data defines a condition for a trigger event which occurs when said measurement result for the CSI-RS, plus an offset value, and minus a hysteresis value exceeds a result of a corresponding measurement for a further of said plurality of cells.

7. The communication device according to claim 1, wherein said configuration data defines a condition for a trigger event which occurs when said measurement result plus the offset value, and plus the hysteresis value falls below a result of a corresponding measurement for a further of said plurality of cells.

8. The communication device according to claim 3, wherein said configuration data defines said hysteresis value.

9. The communication device according to claim 1 wherein said results of said measurements comprise a measure of signal conditions of a source cell.

10. The communication device according to claim 9 wherein said configuration data defines an entry condition for a trigger event which occurs when signal conditions in at least one relay cell are better than signal conditions in a cell in which said communications device is currently connected.

11. The communication device according to claim 9 wherein said configuration data further defines an entry condition for a trigger event which occurs when: (a) signal conditions in at least one relay cell are better than signal conditions in a cell in which said communications device is currently connected; and (b) signal conditions in said at least one relay cell are better than signal conditions in a non-relay neighbour cell.

12. The communication device according to claim 9 wherein said configuration data further defines an entry condition for a trigger event which occurs when: (a) signal conditions in at least one relay cell are better than signal conditions in a cell in which said communications device is currently connected; (b) signal conditions in said at least one relay cell are better than signal conditions in a non-relay neighbour cell; and (c) signal conditions in the current cell fall below a threshold value.

13. The communication device according to claim 9 wherein said configuration data defines an entry condition for a trigger event which occurs when: (a) signal conditions in at least one relay cell are better than a first threshold value; and (b) signal conditions in a cell in which said communications device is currently connected fall below a second threshold.

14. The communication device according to claim 13 wherein said configuration data defines an entry condition for a trigger event which occurs when: (c) signal conditions in a neighbouring cell also fall below said second threshold.

15. A method performed by a communication device for providing measurement reports to a communication network comprising a plurality of cells wherein the communication device is configured to identify an occurrence of any of a plurality of possible trigger events including a plurality of type A trigger events, a plurality of type B trigger events, and at least one further type of trigger event that is different from said type A and type B trigger events, the method comprising:

connecting to a cell, of said plurality of cells, for sending and receiving user data;

receiving configuration data for configuring measurements in at least one of said plurality of cells, wherein said configuration data defines the at least one further type of trigger event, that is different from said type A and type B trigger events, for triggering measurement reporting for measurements of channel state reference signals (CSI-RS) broadcast in at least one cell;

the at least one type of further trigger event for triggering measurement reporting that is different from said type A and type B trigger events is characterised by an entering condition and a leaving condition, wherein the entering condition is met when a measurement result for the CSI-RS, plus an offset value, and minus a hysteresis value exceeds a predetermined value, and the leaving condition is met when a measurement result for the CSI-RS, plus an offset value, and plus a hysteresis value is less than the predetermined value;

performing measurements, based on said received configuration data, in said at least one cell;

determining whether or not said at least one further type of trigger event that is different from said type A and type B trigger events has occurred based on results of said measurements; and sending a measurement report, to the communication network, when said at least one further trigger event that is different from said type A and type B trigger events has been determined to have occurred.

* * * * *